US011633913B2

(12) United States Patent
Luo et al.

(10) Patent No.: US 11,633,913 B2
(45) Date of Patent: Apr. 25, 2023

(54) APPARATUSES FOR PROCESSING ADDITIVE MANUFACTURED OBJECTS AND METHODS OF USE

(71) Applicant: JF Polymers (Suzhou) Co., Ltd., Jiangsu (CN)

(72) Inventors: Xiaofan Luo, Jiangsu (CN); Zhaokun Pei, Jiangsu (CN); Junheng Zhao, Jiangsu (CN); Julia D. Truchsess, Sandy Hook, CT (US)

(73) Assignee: JF POLYMERS (SUZHOU) CO., LTD., Changshu (CN)

( * ) Notice: Subject to any disclaimer, the term of this patent is extended or adjusted under 35 U.S.C. 154(b) by 1040 days.

(21) Appl. No.: 16/257,762

(22) Filed: Jan. 25, 2019

(65) Prior Publication Data

US 2019/0151886 A1    May 23, 2019

Related U.S. Application Data

(63) Continuation of application No. 15/736,702, filed as application No. PCT/CN2016/080225 on Apr. 26, 2016, now Pat. No. 11,000,873.

(30) Foreign Application Priority Data

Jun. 16, 2015    (WO) ............... PCT/CN2015/081512

(51) Int. Cl.
*B29C 64/188*    (2017.01)
*B29C 71/00*    (2006.01)
(Continued)

(52) U.S. Cl.
CPC ........ *B29C 64/188* (2017.08); *B05B 13/0242* (2013.01); *B05B 17/0615* (2013.01);
(Continued)

(58) Field of Classification Search
CPC .............. B29C 71/0009; B29C 64/188; B05B 17/0684
See application file for complete search history.

(56) References Cited

U.S. PATENT DOCUMENTS 3,020,661 A    2/1962    Miller et al.
3,437,727 A *  4/1969    Boyhan ..................... C08J 7/02
                                                    264/341
(Continued)

FOREIGN PATENT DOCUMENTS

CN    103192524 A    7/2013
CN    203401380 U *  1/2014
(Continued)

OTHER PUBLICATIONS

Benchoff, Brian, retrieved from http://hackaday.com/2013/02/26/giving-3d-printed-parts-a-shiny-smooth-fnish/, "Giving 3D Printed Parts a Shiny Smooth Finish", *Hackaday*, pp. 1-36, Feb. 26, 2013.
(Continued)

*Primary Examiner* — Atul P. Khare
(74) *Attorney, Agent, or Firm* — Finnegan, Henderson, Farabow, Garrett & Dunner LLP

(57) ABSTRACT

An apparatus (200) for smoothing a surface of an object (100). The apparatus includes a chamber (210), a reservoir (324) configured to hold a liquid (322), and a nebulizer assembly (212) configured to generate a mist (104) from the liquid into the chamber. The nebulizer assembly includes a mesh (732), a vibrating element (731), and a wick (736). The object is received in the chamber and the mist is configured to surround the object.

20 Claims, 18 Drawing Sheets

(51) Int. Cl.
  *B05B 13/02* (2006.01)
  *B05B 17/06* (2006.01)
  *B29C 64/30* (2017.01)
  *B33Y 40/20* (2020.01)
  *B05C 3/109* (2006.01)
  *B05C 11/10* (2006.01)
  *B05C 3/00* (2006.01)
  *B05B 7/16* (2006.01)
  *B05B 7/24* (2006.01)
  *B29C 64/118* (2017.01)

(52) U.S. Cl.
  CPC .......... *B05C 3/109* (2013.01); *B05C 11/1002* (2013.01); *B29C 64/30* (2017.08); *B29C 71/0009* (2013.01); *B33Y 40/20* (2020.01); *B05B 7/1666* (2013.01); *B05B 7/2424* (2013.01); *B29C 64/118* (2017.08)

(56) References Cited

U.S. PATENT DOCUMENTS

| | | | |
|---|---|---|---|
| 3,807,054 A * | 4/1974 | Joseph | B05B 16/95 |
| | | | 34/470 |
| 4,260,873 A | 4/1981 | Simmonds | |
| 5,121,329 A | 6/1992 | Crump | |
| 5,346,132 A | 9/1994 | Hahn et al. | |
| 5,448,838 A | 9/1995 | Edmonds | |
| 5,804,507 A | 9/1998 | Perlov et al. | |
| 6,248,398 B1 | 6/2001 | Talieh et al. | |
| 7,129,619 B2 | 10/2006 | Yang et al. | |
| 7,954,728 B2 | 6/2011 | Weng et al. | |
| 8,001,962 B2 | 8/2011 | Sheiman | |
| 8,075,300 B2 | 12/2011 | Zinniel | |
| 8,123,999 B2 | 2/2012 | Priedeman, Jr. et al. | |
| 8,765,045 B2 * | 7/2014 | Zinniel | B33Y 40/20 |
| | | | 264/341 |
| 8,961,167 B2 | 2/2015 | Swanson et al. | |
| 8,998,679 B2 * | 4/2015 | Huang | A61F 2/82 |
| | | | 451/36 |
| 10,076,585 B2 * | 9/2018 | Gruenbacher | A45D 34/00 |
| 10,625,292 B2 * | 4/2020 | Dufort | B29C 64/30 |
| 2005/0173838 A1 | 8/2005 | Priedeman, Jr. et al. | |
| 2008/0075777 A1 | 3/2008 | Kennedy | |
| 2008/0169585 A1 * | 7/2008 | Zinniel | B29C 71/0009 |
| | | | 264/293 |
| 2009/0032062 A1 | 2/2009 | Randhawa et al. | |
| 2009/0321972 A1 | 12/2009 | Zinniel | |
| 2011/0033609 A1 | 2/2011 | Jiang et al. | |
| 2011/0236544 A1 | 9/2011 | Bortoletto et al. | |
| 2014/0145000 A1 | 5/2014 | Verschueren | |
| 2014/0361095 A1 | 12/2014 | Haran | |
| 2015/0097047 A1 | 4/2015 | Hu et al. | |
| 2015/0306623 A1 | 10/2015 | Kawano et al. | |
| 2019/0375158 A1 * | 12/2019 | Crabtree | B33Y 40/20 |
| 2021/0170702 A1 * | 6/2021 | Abstreiter | B29C 64/153 |

FOREIGN PATENT DOCUMENTS

| | | | |
|---|---|---|---|
| CN | 104271255 A | | 1/2015 |
| CN | 104385593 A | * | 3/2015 |
| CN | 204526140 U | * | 8/2015 |
| KR | 101509432 | | 4/2015 |

OTHER PUBLICATIONS

Frick, Lindsey, retrieved from http://machinedesign.com/3d-printing/how-smooth-3d-printed-parts/, "How to Smooth 3D-Printed Parts", *3D Printing*, pp. 40-41 (2014).
International Search Report and Written Opinion issued in International Application No. PCT/CN2016/080225, dated Jul. 14, 2016.
Extended European Search Report and the European Search Opinion dated Feb. 21, 2019, for European Application No. 16810835.5.
Extended European Search Report and the European Search Opinion dated Feb. 22, 2019, for European Application No. 18200852.4.

* cited by examiner

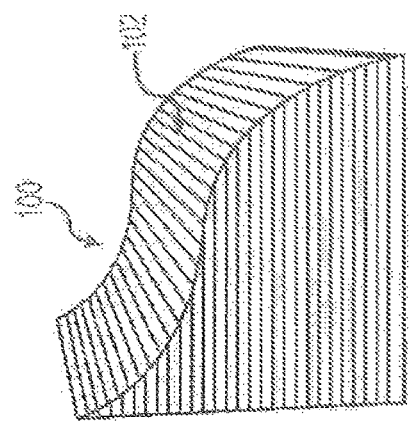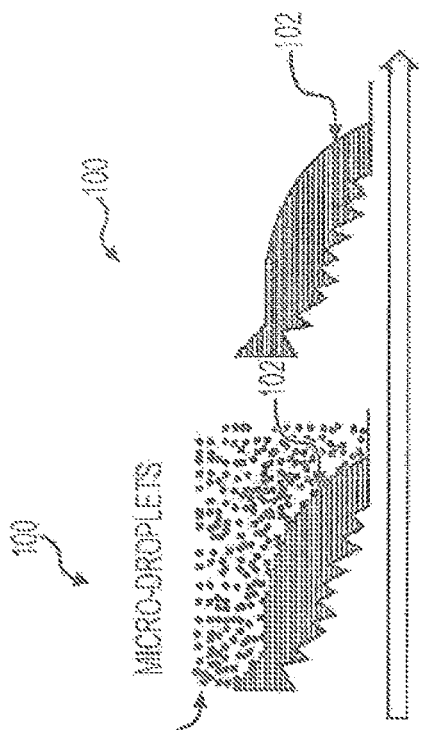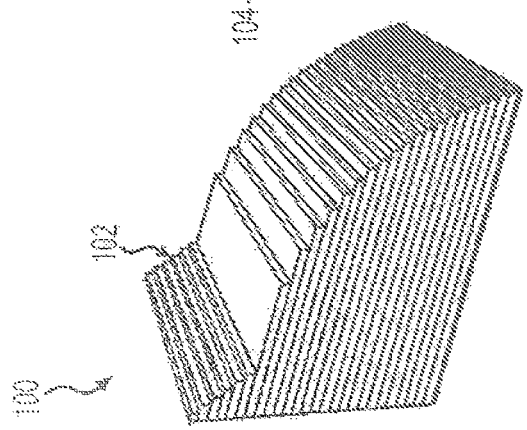

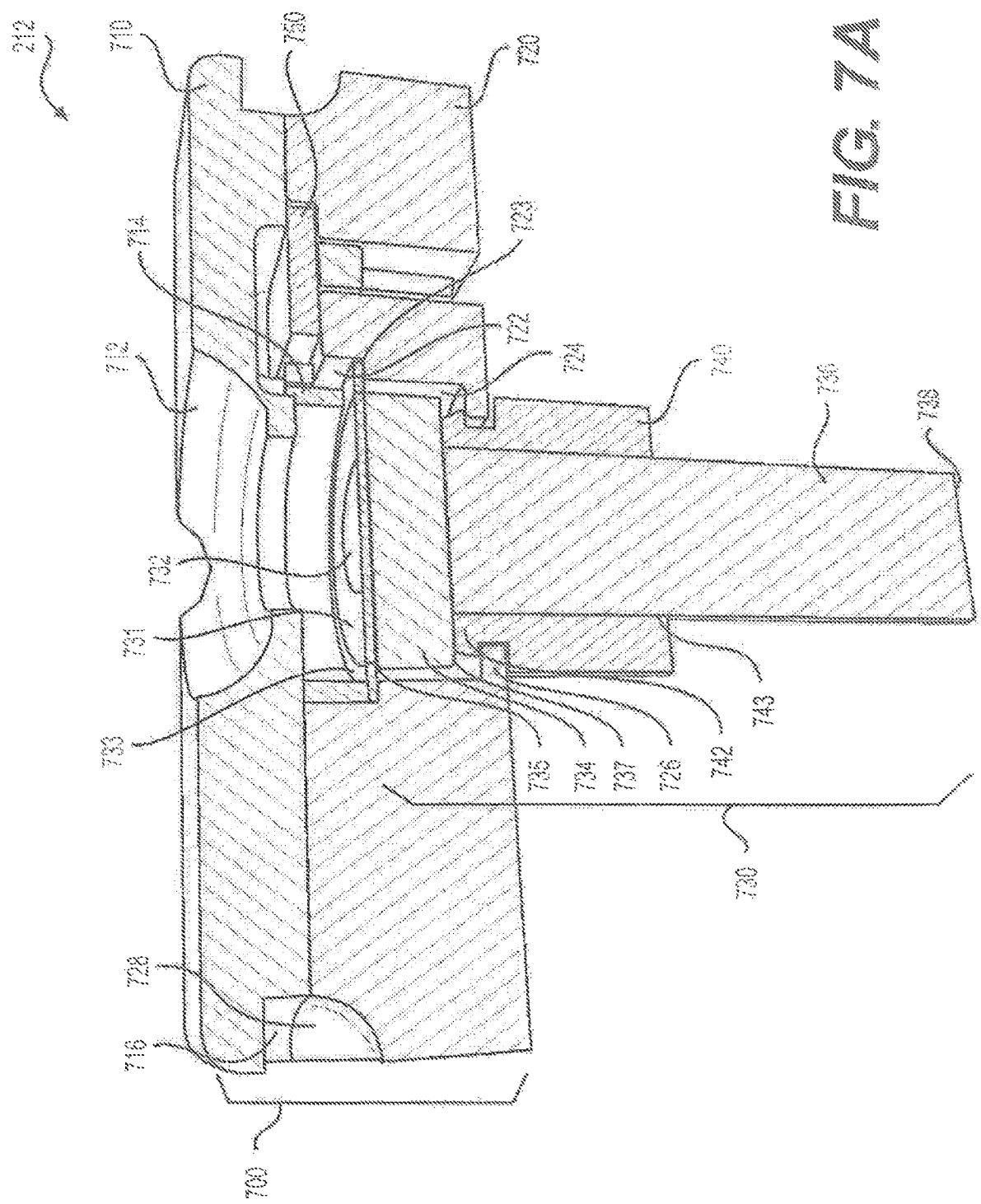

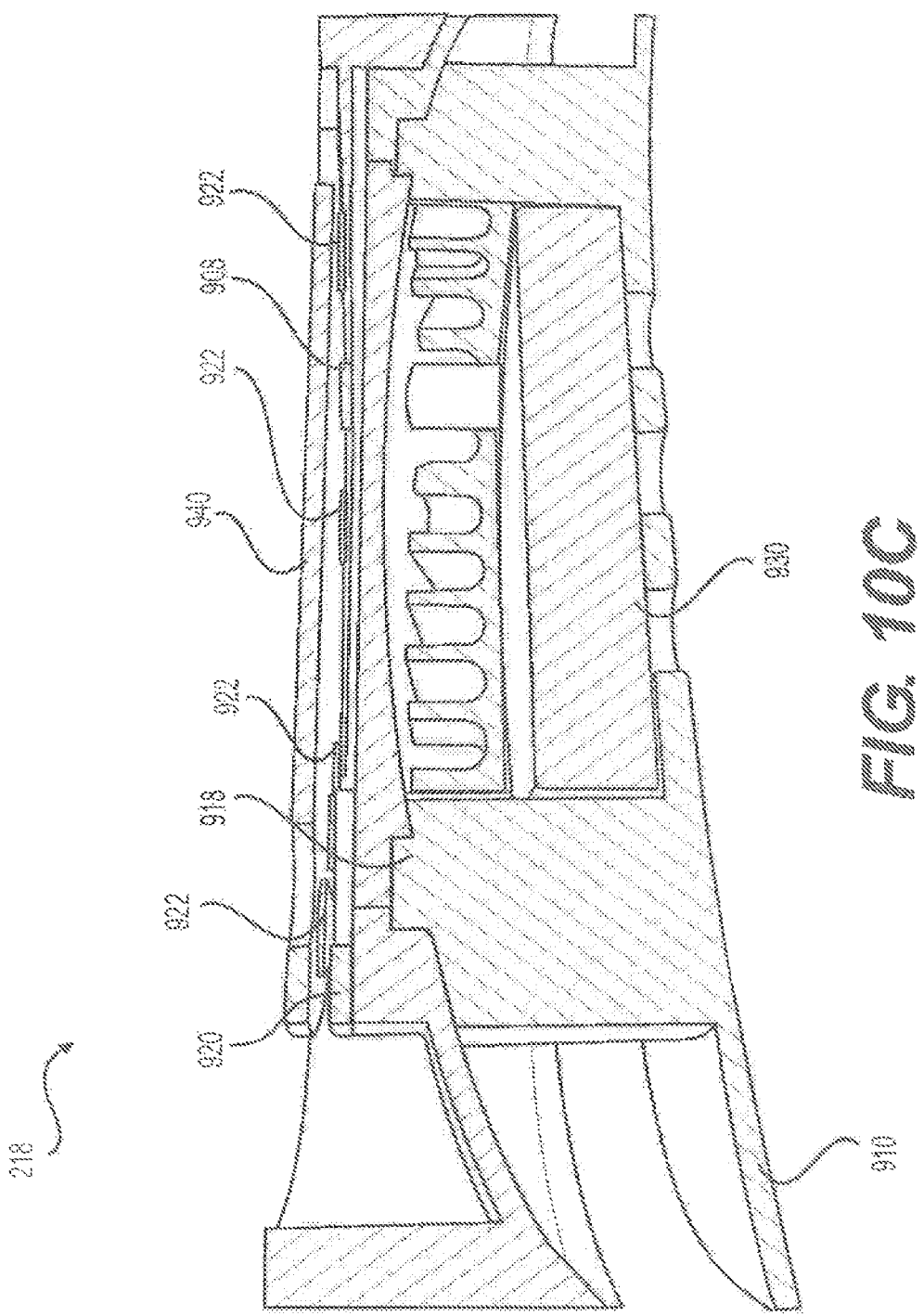

APPARATUSES FOR PROCESSING ADDITIVE MANUFACTURED OBJECTS AND METHODS OF USE

CROSS-REFERENCE TO RELATED APPLICATIONS

This application is a continuation of U.S. patent application Ser. No. 15/736,702, filed Dec. 14, 2017, which is a National Stage Application under 35 U.S.C. § 371 of International Application No. PCT/CN2016/080225, filed Apr. 26, 2016, which claims priority to and benefits of International Patent Application No. PCT/CN2015/081512, filed Jun. 16, 2015, all of which are incorporated herein by reference in its entirety their entireties.

TECHNICAL FIELD

Embodiments of the present disclosure are directed to methods and apparatuses for processing objects, and more particularly, to methods and apparatuses for processing objects created using additive manufacturing processes.

BACKGROUND OF THE DISCLOSURE

Additive manufacturing is any of various manufacturing technologies that build objects in an additive, typically layer-by-layer, fashion. Additive manufacturing is also referred to by the general public as "3D printing". One type of the additive manufacturing technologies is based on extrusion deposition, such as fused deposition modeling® (FDM®) or fused filament fabrication (FFF). Over the last few years FDM® or FFF has become a commonly used technology for modeling, prototyping, and production applications.

FDM® or FFF generally involve feeding a thermoplastic polymer in the form of a continuous filament to a heated extrusion nozzle. The thermoplastic polymer in the extrusion nozzle may be heated to a temperature above its glass transition temperature, at which the thermoplastic filament may become a viscous melt and therefore be extruded. The extrusion nozzle may be moved in a three-dimensional motion and precisely controlled by step motors and computer-aided manufacturing (CAM) software so that an object may be built from the bottom up, one layer at a time. The first layer of the object may be deposited on a substrate and additional layers may be sequentially deposited and fused (or partially fused) to the previous layer by solidification due to a drop in temperature. The process may continue until the three-dimensional object is fully constructed. This technology is disclosed in, for example, U.S. Pat. No. 5,121,329.

An object created using an additive manufacturing process, such as FDM® or FFF, may have a series of grooves, ridges, and/or edges along the surface where the thermoplastic filament is sequentially deposited and fused (or partially fused) onto the previous layer. This may result in a surface that has a rougher finish than what can be achieved using other manufacturing methods, e.g., injection molding. The rougher finish has several disadvantages. First, the objects created using the additive manufacturing processes can be less aesthetically appealing compared to those prepared using other manufacturing methods, such as injection molding. Second, a rougher surface finish can make it difficult to apply additional surface finishing techniques, such as painting or electroplating, to the objects. Additionally, the grooves, ridges, and/or edges on the surface of the objects may serve as stress concentrators that may lead to reduced mechanical properties of the objects.

Methods for reducing the roughness of the surface of an object made using additive manufacturing processes may include, for example, sanding or other techniques using abrasive materials to remove some of the thermoplastic filament at, for example, the ridges and edges. Many of the materials used in FDM® and FFF additive manufacturing processes have relatively low softening temperatures. Such sanding can have a detrimental effect on the shape or features of the part created because of the substantial amount of heat that can be generated by friction. Another method for reducing the roughness of the surface of an object made using additive manufacturing processes is shot peening or shot blasting with some media. Both sanding and shot blasting require extensive skills, labor, and time to effectively reduce the roughness of the surface of the object. Other methods involve exposing an object made using additive manufacturing processes to a solvent vapor generated by heating a reservoir of organic solvent. However, the organic solvent vapor can be highly flammable and may have negative health effects on the user exposed to the vapor. Additionally, the heated solvent vapor can lead to macroscopic deformation of the object during the exposure.

Accordingly, there exists a need for methods and apparatuses to improve the smoothness or reduce the roughness of the surface of objects, for example, objects created using additive manufacturing processes.

SUMMARY OF THE DISCLOSURE

Embodiments of the present disclosure are directed to methods and apparatuses for processing additive manufactured objects Various embodiments of the disclosure may include one or more of the following aspects.

In accordance with one embodiment, an apparatus for smoothing a surface of an object may include a chamber a reservoir configured to hold a liquid, and a nebulizer assembly configured to generate a mist from the liquid into the chamber. The nebulizer assembly may include a mesh, a vibrating element, and a wick. The object may be received in the chamber and the mist is configured to surround the object.

Various embodiments of the apparatus may include one or more of the following features: the object may be made by an additive manufacturing technique using at least one thermoplastic polymer; the nebulizer assembly may further include a driver circuit electrically connected to the vibrating element; the apparatus may further include control circuits; the control circuits may include a memory and a processing circuit electrically connected to the driver circuit; the memory may store a plurality of instructions for operation of the apparatus and/or the nebulizer assembly, and the processing circuit may execute at least one of the instructions and send electrical signals associated with the executed instructions to the driver circuit; the apparatus may further include a user control electrically connected to the control circuits; the mesh and the vibrating element of the nebulizer assembly may form an integrated part; the apparatus may further include a plate between the chamber and the reservoir; the plate may have at least one opening and/or a concave surface configured to allow micro droplets of the mist to pass through; the apparatus may further include a rotatable platform and a motor configured to rotate the rotatable platform; the object may be received on the rotatable platform; the nebulizer assembly may further include a coupler placed between the vibrating element and the wick;

the coupler may be configured to transport the liquid from the wick to the mesh with limited or minimized impact on movement of the mesh caused by the vibrating element; the coupler and the wick of the nebulizer assembly may be one integrated part; the coupler and/or wick may be made of a material that does not substantially dissolve in or react with the liquid; the material of the coupler and/or wick may include a plurality of pores and/or channels; the material of the coupler and/or wick may be a soft, a compressible, a compliant, a squishy, a foam-like, a sponge, or a resiliency deformable material; the mist may include micro droplets whose diameters range from 5 μm to 100 μm; the apparatus may further include a plurality of light sources configured to illuminate the mist and/or the object; the apparatus may further include an automatic or a manual lifting mechanism configured to raise the object out of the chamber and/or configured to lower the object into the chamber; the apparatus may further include an air-agitating device configured to Increase movement of the air and/or micro droplets of the mist in the chamber; the nebulizer assembly may be configured to generate a continuous, intermittent, or pulsatile mist, or combinations thereof; the at least one thermoplastic polymer may be selected from vinyl acetal polymers, acrylonitrile-butadiene-styrene, poly (lactic acid), polycarbonate, polystyrene, high impact polystyrene, polycaprolactone, polyamide and polyamide copolymers, and cellulose based polymers; the liquid may include at least one solvent selected from alcohols, ethers, esters, and ketones.

In accordance with another embodiment, a method for smoothing a surface of an object may include receiving the object in a chamber, generating a mist by a nebulizer assembly from a liquid held in a reservoir into the chamber, and surrounding the object with the mist. The nebulizer assembly may include a mesh, a vibrating element, and a wick.

Various embodiments of the method may include one or more of the following features: the method may further Include making the object by an additive manufacturing technique using at least one thermoplastic polymer; the nebulizer assembly may further include a driver circuit electrically connected to the vibrating element; the method may further include operating the nebulizer assembly by control circuits comprising a memory and a processing circuit electrically connected to the driver circuit; the memory may store a plurality of instructions for the operation of the nebulizer assembly; the processing circuit may execute at least one of the instructions and send electrical signals associated with the executed instructions to the driver circuit; the control circuits may be electrically connected to a user control; the mesh and the vibrating element of the nebulizer assembly may form an integrated part; there may be a plate located between the chamber and the reservoir; the plate may have at least one opening and/or a concave surface configured to allow micro droplets of the mist to pass through; the method may further include rotating the rotatable platform by a motor; the object may be received on the rotatable platform; the nebulizer assembly may further include a coupler placed between the vibrating element and the wick; the coupler may be configured to transport the liquid from the wick to the mesh with limited or minimized impact on movement of the mesh caused by the vibrating element; the coupler and the wick may be one integrated part; the coupler and/or the wick may be made of a material that does not substantially dissolve in or react with the liquid; the material may include a plurality of pores and/or channels; the material may be a soft, a compressible, a compliant, a squishy, a foam-like, a sponge, or a resiliency deformable material; the mist may include micro droplets whose diameters range from 5 μm to 100 μm; the method may further include illuminating the mist and/or the object using a plurality of light sources; the method may further include raising the object out of the chamber, and/or lowering the object into the chamber using an automatic or a manual lifting mechanism; the method may further include increasing movement of the air and/or micro droplets of the mist in the chamber using an air-agitating device; the method may further include generating by the nebulizer assembly a continuous, intermittent, or pulsatile mist, or combinations thereof; the at least one thermoplastic polymer may be selected from vinyl acetal polymers, acrylonitrile-butadiene-styrene, poly (lactic add), polycarbonate, polystyrene, high impact polystyrene, polycaprolactone, polyamide and polyamide copolymers, and cellulose based polymers; the liquid may include at least one solvent selected from alcohols, ethers, esters, and ketones.

In accordance with another embodiment, an apparatus for smoothing a surface of an object may include a chamber, a reservoir configured to hold a liquid, a nebulizer assembly configured to generate a mist from the liquid into the chamber, and an air-agitating device. The object may be placed in the chamber. The mist may be configured to substantially uniformly surrounding the object.

In accordance with another embodiment, a nebulizer assembly for generating a mist from a liquid may include a mesh, a vibrating element, a wick configured to absorb the liquid, and a coupler having a first surface contacting the mesh and/or the vibrating element, and a second surface contacting the wick. The coupler may be configured to transport the liquid from the wick to the mesh with substantially limited impact on movement of the mesh caused by the vibrating element.

Objects created using additive manufacturing processes may be made with thermoplastic polymers, including composite materials with thermoplastic matrices. Suitable additive manufacturing processes may include, but are not limited to, material extrusion based techniques, such as FDM® and FFF, power bed fusion such as selective laser sintering (SLS), sheet lamination, binder jetting, and material jetting. In some embodiments, objects may be created by any suitable additive manufacturing technique, including those to be developed in the future that fall into the scope of the term "additive manufacturing" known in the art.

Embodiments of the present disclosure are advantageous over previous methods. One advantage is that heating of a liquid is not necessarily required to generate a mist. The liquid, e.g., alcohols or alcohol solutions, used in the methods and apparatuses disclosed herein are typically benign in terms of toxicity, which reduces the health risk to users of the methods and apparatuses disclosed herein. Further, distribution and/or density of the mist are substantially easier to observe than organic solvent vapor so that detecting or observing a leak of the mist from an enclosed chamber can be much easier. Another advantage is that the methods and apparatuses disclosed herein allow an amount of processing time ranging from about 10 to about 60 minutes to substantially reduce the roughness of the surface of the object or to achieve a satisfactory surface smoothness of the object. Additionally, methods and apparatuses disclosed herein may allow processing and/or smoothing of more than one object at a time. Another advantage is that the methods and apparatuses disclosed herein may not change the overall shape and/or form of the object. The mist is generated from the liquid approximately at room temperature without heating the liquid. This may limit, prevent, or substantially reduce the deformation of the object while being exposed to the mist. Finally, the methods and apparatuses disclosed herein allow efficient generation of the mist from the liquid so that a small or minimal amount of liquid Is consumed to process one or more objects.

The details of one or more variations of the present disclosure are set forth below and the accompanying drawings. Other features and advantages of the present disclosure will be apparent from the detailed description below and drawings, and from the claims.

Further modifications and alternative embodiments will be apparent to those of ordinary skill in the art in view of the present disclosure. For example, the methods and apparatuses may include additional components or steps that are omitted from the diagrams and description for clarity of operation. Accordingly, the detailed description below is to be construed as illustrative only and is for the purpose of teaching those skilled in the art the general manner of carrying out the present disclosure, it is to be understood that the various embodiments disclosed herein are to be taken as exemplary. Elements and materials, and arrangements of those elements and materials, may be substituted for those illustrated and disclosed herein, parts and processes may be reversed, and certain features of the present disclosure may be utilized independently, all as would be apparent to one skilled in the art after having the benefit of the disclosure herein. Changes may be made in the embodiments disclosed herein without departing from the spirit and scope of the present disclosure and the claims.

BRIEF DESCRIPTION OF THE DRAWINGS

FIG. 1A illustrates a perspective view of a surface of an exemplary object, according to embodiments of the present disclosure.

FIG. 1B illustrates a cross-sectional view of exemplary micro droplets of a mist surrounding the surface of the object shown in FIG. 1A, according to embodiments of the present disclosure.

FIG. 1C illustrates a cross-sectional view of the surface of the object shown in FIG. 1A after exposure to the micro droplets of the mist, as shown in FIG. 1B, according to embodiments of the present disclosure.

FIG. 1D illustrates a perspective view of the surface of the object after exposure to the micro droplets of the mist, as shown in FIG. 1B according to embodiments of the present disclosure.

FIG. 7A illustrates a cross-section of an exemplary nebulizer, according to embodiments of the present disclosure.

FIG. 10C illustrates a cross-section of a lid of an exemplary apparatus, according to embodiments of the present disclosure.

DETAILED DESCRIPTION

Figure 2:
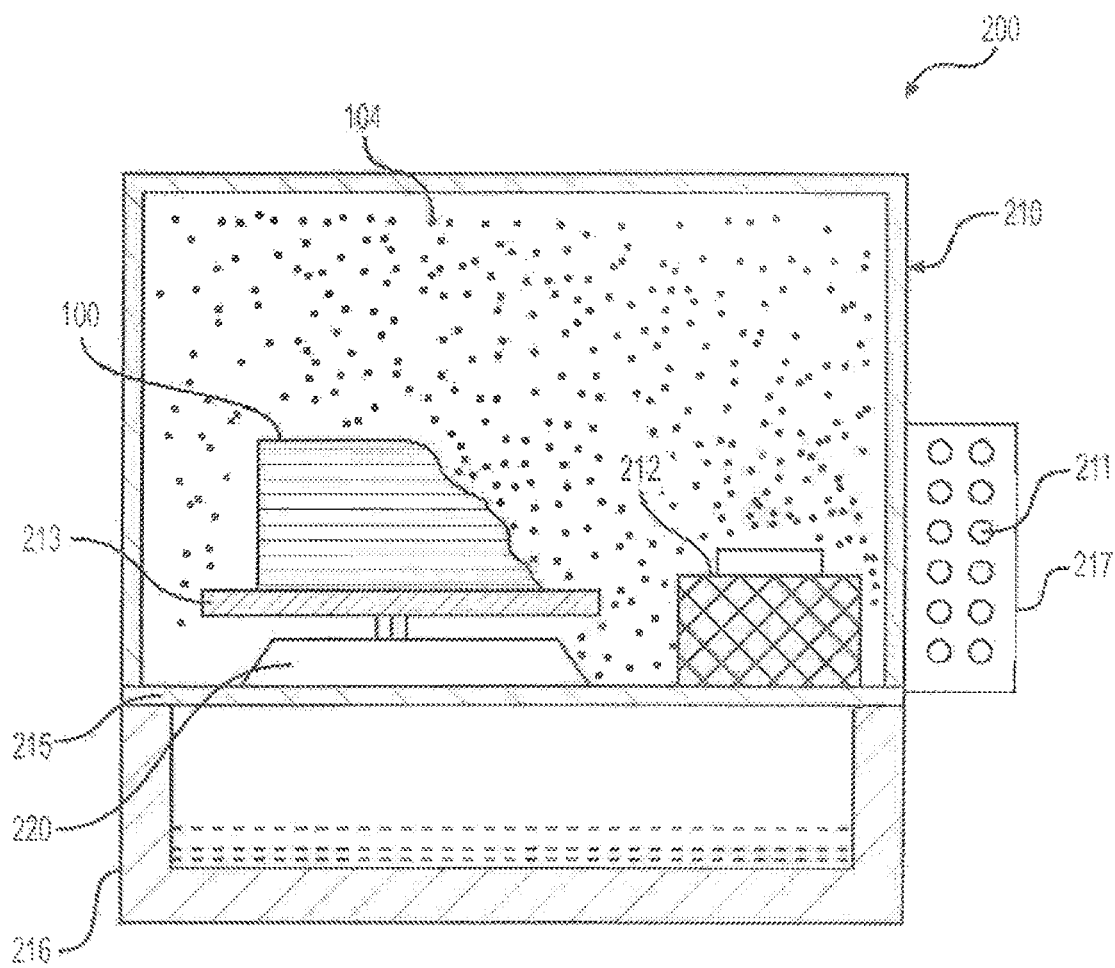
FIG. 2 illustrates a cross-section of an exemplary apparatus, according to embodiments of the present disclosure.

This description and the accompanying drawings that illustrate exemplary embodiments should not be taken as limiting. Various mechanical, compositional, structural, electrical, and operational changes may be made without departing from the scope of this description and the claims, including equivalents. In some instances, well-known structures and techniques have not been shown or described in detail so as not to obscure the disclosure. Similar reference numbers in two or more figures represent the same or similar elements. Furthermore, elements and their associated features that are disclose in detail with reference to one embodiment may, whenever practical, be included in other embodiments in which they are not specifically shown or described. For example, if an element is described in detail with reference to one embodiment and is not described with reference to a second embodiment, the element may nevertheless be claimed as included in the second embodiment.

For the purposes of this specification and appended claims, unless otherwise indicated, all numbers expressing quantities, percentages, or proportions, and other numerical values used in the specification and claims, are to be understood as being modified in all instances by the term "about," to the extent they are not already so modified. Accordingly, unless indicated to the contrary, the numerical parameters set forth in the following specification and attached claims are approximations that may vary depending upon the desired properties sought to be obtained. At the very least, and not as an attempt to limit the application of the doctrine of equivalents to the scope of the claims, each numerical parameter should at least be construed in light of the number of reported significant digits and by applying ordinary rounding techniques.

It is noted that, as used in this specification and the appended claims, the singular forms "a," "an," and "the," and any singular use of any word, include plural referents unless expressly and unequivocally limited to one referent. As used herein, the term "include" and its grammatical variants are intended to be non-limiting, such that recitation of items in a list is not to the exclusion of other like items that can be substituted or added to the listed items.

Further, this description's terminology is not intended to limit the invention. For example, spatially relative terms, such as "beneath", "below", "lower", "above", "upper", "proximal", "distal", and the like, may be used to describe one element's or feature's relationship to another element or feature as illustrated in the figures. These spatially relative terms are intended to encompass different positions (i.e., locations) and orientations (i.e., rotational placements) of a device in use or operation in addition to the position and orientation shown in the figures. For example, if a device in the figures is turned over, elements described as "below" or "beneath" other elements or features would then be "above" or "over" the other elements or features. Thus, the exemplary term "below" can encompass both positions and orientations of above and below. A device may be otherwise oriented (rotated 90 degrees or at other orientations) and the spatially relative descriptors used herein may be interpreted accordingly.

Disclosed herein are methods and apparatuses for processing, an object, e.g., an object made using additive manufacturing processes. The methods may include processing an object using a mist generated from a liquid. As disclosed herein, a mist may refer to an aerosol and/or a collection of small droplets, e.g., micro droplets, of a liquid suspended in air. The mist may interact with the surface of the object and may reduce the roughness or improve the smoothness of the surface of the object. This reduction in surface roughness or improvement in surface smoothness may be referred to as "finishing", "polishing," or "smoothing" the object, and may create, after processing of the object using the methods disclosed herein, a surface that is more smooth and/or shiny, e.g., reflecting more light, compared to the surface of the object prior to the processing, e.g., polishing, smoothing, and/or finishing. As described herein, both roughness and smoothness may be used to describe the evenness and the texture of the surface of an object.

Additionally or alternatively, the methods may not produce a substantially shiny surface after processing the object. In some embodiments, the methods for processing the object may cause a specific and/or desirable degree of roughness to the surface of the object. This may allow specific types of finishing steps to be applied to the surface of the object to achieve some desired attributes, such as colors. Such finishing steps may include, for example, painting, electroplating, or other suitable techniques that require a particular texture or roughness of the surface of the object to maximize desired attributes created by these finishing steps.

FIGS. 1A-1D illustrate an exemplary method for processing an object 100, e.g., an object made using an additive manufacturing process. As described herein, processing of object 100 may include increasing the smoothness and/or reducing the roughness of the surface of object 100 to a suitable degree, and may be referred to as smoothing or polishing object 100. FIG. 1A illustrates a perspective view of a surface 102 of object 100 before the processing. In some embodiments, a method for processing object 100 may include generating a mist 104 from a liquid and surrounding surface 102 of object 100 with mist 104. Mist 104 may include micro droplets that may be suspended or distributed in air. For example, FIG. 1B illustrates a cross-sectional view of micro droplets of mist 104 surrounding surface 102 of object 100. FIG. 1C illustrates a cross-sectional view of surface 102 of object 100 after being exposed to mist 104 or surrounded by the micro droplets of mist 104. In some embodiments, a method for processing object 100 may include allowing object 100 to be exposed to mist 104 or surrounded by the micro droplets of mist 104 for a predetermined amount of time. FIG. 1D illustrates a perspective view of surface 102 of object 100 after the processing. Methods for processing object 100 in accordance with the current disclosure may reduce the roughness, e.g., textures, grooves, edges, and/or ridges on surface 102 of object 100, and/or increase the smoothness of surface 102 of object 100.

In some embodiments, object 100 may be manufactured using any suitable additive manufacturing process. These additive manufacturing processes may include, for example, material extrusion, binder jetting, material jetting, sheet lamination, powder bed fusion, selective laser melting (SLM), direct metal laser sintering (DMLS), selective laser sintering (SLS), selective heat sintering (SHS), robocasting, stereolithography (SLA), laminated object manufacturing (LOM), digital light processing (DLP), plaster-based 3D printing (PP), electron-beam melting (EBM), electron beam freeform fabrication (EBF), and photopolymerization.

Object 100 may be made of a material suitable for an additive manufacturing process, such as FDM® or FFF. For example, object 100 may be made of a material selected from vinyl acetal polymers, acrylonitril-butadiene-styrene (ABS), poly(lactic acid) (PLA), polycarbonate (PC), polystyrene (PS), high impact polystyrene (HIPS), polycaprolactone (PCL), polyamide or polyamide copolymers, and cellulose based polymers. In some embodiments, object 100 may be made of at least one thermoplastic polymer selected from vinyl acetal polymers, polyamide or polyamide copolymers, and cellulose based polymers. The vinyl acetal polymers may be selected from poly (vinyl butyral). In some embodiments, the poly (vinyl butyral) may include vinyl acetate, vinyl alcohol, and vinyl butyral monomeric units. In some embodiments, the poly (vinyl butyral) may include vinyl acetate monomeric units in an amount ranging from about 0% to about 1%, from about 0% to about 2%, from about 0% to about 3%, from about 0% to about 4%, or from about 0% to about 5%, by weight. In some embodiments, the poly (vinyl butyral) may include vinyl alcohol monomeric units in an amount ranging from about 10% to about 30%, from about 15% to about 30%, from about 20% to about 30%, from about 10% to about 15%, or from about 10% to about 25%, by weight. In some embodiments, the poly (vinyl butyral) may include vinyl butyral monomeric units in an amount ranging from about 65% to about 90%, from about 65% to about 70%, from about 65% to about 80%, from about 70% to about 80% from about 71% to about 85%, or from about 80% to about 90%, by weight.

The methods and apparatuses disclosed herein may be applied to objects made with any suitable manufacturing process as long as the material used for making the objects is a thermoplastic polymer, for example, a composite material having a thermoplastic polymer matrix.

FIG. 2 illustrates an exemplary apparatus 200 for processing object 100. Apparatus 200 may include a first chamber 210 that may provide an enclosed and/or sealed space for processing object 100. Apparatus 200 may include a second chamber 216. Chamber 216 may be used to store or hold a liquid 322. Apparatus 200 may include a nebulizer 212 that is used to generate the micro droplets of mist 104 from liquid 322. Apparatus 200 may include a user control 211 and control circuits 217. User control 211 and/or control circuits 217 may be used to adjust and control apparatus 200, e.g., adjust or control nebulizer 212.

In some embodiments, apparatus 200 may include a rotatable platform 213 and a rotational motor 220. Rotational motor 220 may be electrically connected to control circuits 217 and may be controlled or adjusted by user control 211 and/or control circuits 217. Object 100 may be removably received on rotatable platform 213. During the processing of object 100, mist 104 generated by nebulizer 212 may surround object 100 placed on rotatable platform 213 inside chamber 210, as shown in FIG. 2, and object 100 may rotate in the same rotational motion as rotatable platform 213.

In some embodiments, apparatus 200 may include a porous membrane 215. Porous membrane 215 may be located between chamber 210 and chamber 216, and may allow the micro droplets of mist 104 in chamber 210 to pass, such as flow, diffuse, and/or disperse, through into chamber 216. The porous membrane 215 may be made of any suitable material whose pore sizes allow the micro droplets of mist 104 or a collection of the micro droplets that do not coat or interact with object 100 to pass through.

Increasing the uniformity and/or evenness of the micro droplets of mist 104 surrounding object 100 may increase the evenness and/or uniformity of the exposure of object 100 to the micro droplets, and thus may increase the uniformity and/or evenness of the smoothing of the surface of object 100. For example, rotatable platform 213 may allow object 100 to rotate while being surrounded by mist 104. The rotation of object 100 may allow different locations and/or sides of object 100 to be substantially similarly exposed to mist 104, and thus may allow the different locations and/or sides of object 100 to have substantially uniform degree of smoothness after the processing.

Although FIG. 2 shows one nebulizer 212, in some embodiments, more than one nebulizer 212 may be included in apparatus 200 to increase the volume and/or density of mist 104 in chamber 210. Although FIG. 2 shows nebulizer 212 located inside chamber 210, in some embodiments, nebulizer 212 may also be located outside of chamber 210. In such embodiments, the micro droplets of mist 104 may be transported from an external nebulizer 212 into chamber 210 through an opening and/or a conduit.

Liquid 322 may be selected based on the material used to manufacture object 100. Liquid 322 may substantially dissolve or partially dissolve the material of object 100. In some embodiments, liquid 322 may include a solvent. As disclosed herein, a solvent may refer to any substance that may dissolve a solute, i.e., a chemically different liquid, solid, or gas, resulting in a solution. Examples of a suitable liquid 322 may include, but are not limited to, organic solvents, such as alcohols (e.g., methanol, ethanol, isopropanol, n-propanol, isobutanol, butanol, neopentyl alcohol), ethers (e.g., diethyl ether, dimethyl ether, tetrahydrofuran, dioxane, propylene oxide), esters (e.g., methyl acetate, ethyl acetate, propyl acetate, isopropyl acetate, benzyl benzoate, butyl acetate, and isoamyl acetate), ketones (e.g., acetone, methyl butyl ketone, methyl ethyl ketone (MEK), cyclohexanone, isophorone, and methyl isobutyl ketone), diols diol-derivatives (e.g., 2-methoxyethanol, 2-ethoxyethanol), acids (e.g., formic acid and acetic acid), and hydrocarbon solvents (e.g., alkanes, alkenes, and alkynes generally with 12 carbon units or less, benzene, methylbenzene, xylene, and terpenes such as limonene). Suitable liquid 322 may also be mixtures of multiple liquids, and may include any combination of liquid mixtures. A suitable liquid 322 may also be mixed with the inorganic solvent water. In some embodiments, any one of the liquids described above may also be mixed with water or other miscible liquids to generate liquid 322 that has desired characteristics.

In some embodiments, liquid 322 may include an amount of ethanol and/or isopropanol. Ethanol and/or isopropanol are widely available and relatively inexpensive. In some embodiments, the amount of ethanol and/or isopropanol in liquid 322 may range from about 10% to about 20%, from about 20% to about 30%, from about 30% to about 40%, from about 40% to about 50%, from about 50% to about 60%, from about 60% to about 70%, from about 70% to about 80%, from about 10% to about 30%, from about 10% to about 40%, from about 10% to about 50%, from about 10% to about 60%, from about 20% to about 40%, from about 20% to about 50%, from about 20% to about 60%, from about 20% to about 80%, from about 30% to about 50%, from about 30% to about 60%, from about 30% to about 70%, from about 30% to about 80%, from about 40% to about 60%, from about 40% to about 70%, from about 40% to about 80%, from about 50% to about 70%, from about 50% to about 80%, from about 60% to about 80%, or from about 10% to about 80%, by weight or by volume.

In some embodiments, to use ethanol and/or isopropanol as an organic solvent in liquid 322, object 100 needs to be made of a material that is soluble or partially soluble in ethanol and/or isopropanol. In such embodiments, examples of the materials that can be used for making object 100 may include polyamide copolymers, cellulose based polymers (e.g., nitrocellulose, cellulose acetate propionate (CAP), cellulose acetate butyrate (CAB), methyl cellulose and ethyl cellulose), and vinyl acetal polymers.

FIG. 3A illustrates an exemplary nebulizer 212. Nebulizer 212 may include a reservoir 324 for holding liquid 322. Nebulizer 212 may include a membrane 320 and an absorbent material 323 placed between membrane 320 and reservoir 324. Liquid 322 may be transported from reservoir 324 to membrane 320 via wicking, i.e., capillary action. Other suitable methods may be used to transport liquid 322 from reservoir 324 to membrane 320, which may include, but are not limited to, a capillary tube, a tube and a pump, a gravity feed from another reservoir, or any other suitable method.

Membrane 320 may be vibrated to generate the micro droplets of mist 104 from liquid 322 transported to the membrane. Membrane 320 may be a porous, vibrating membrane. The use of membrane 320 may increase the efficiency for generating mist 104, may reduce the energy consumption of nebulizer 212, and/or may reduce the equipment and/or hardware needed to generate mist 104.

A material suitable for membrane 320 may have several hundred to several thousand of pores or holes with average diameters ranging from about 1 μm to about 10 μm, from about 1 μm to about 8 μm, from about 1 μm to about 6 μm, from about 1 μm to about 4 μm, from about 2 μm to about 6 μm, from about 4 μm to about 8 μm, from about 4 μm to about 10 μm, or from about 6 μm to about 10 μm. In other embodiments, membrane 320 may have any number and/or surface density of holes or pores sufficient to generate the desired size and/or density of the micro droplets of mist 104.

FIG. 3B illustrates another exemplary nebulizer 212. Nebulizer 212 may include an ultrasonic atomizer 336 completely or partially immersed in liquid 322. Ultrasonic atomizer 336 may have a shape of a disk. Ultrasonic atomizer 336 may include a piezoelectric element, and may vibrate and generate ultrasonic waves when applied with electric power. This vibration may agitate liquid 322 and may generate micro droplets of mist 104 from liquid 322. In some embodiments, ultrasonic atomizer 336 may include any suitable device that generates ultrasonic waves, such as high frequency ultrasonic waves.

Figure 3A:
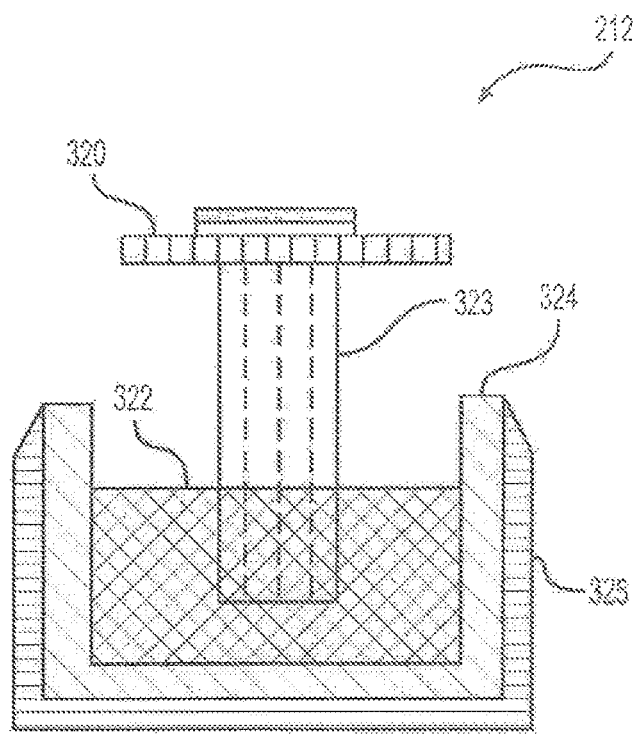
FIG. 3A illustrates an exemplary nebulizer, according to embodiments of the present disclosure.
Figure 3B:
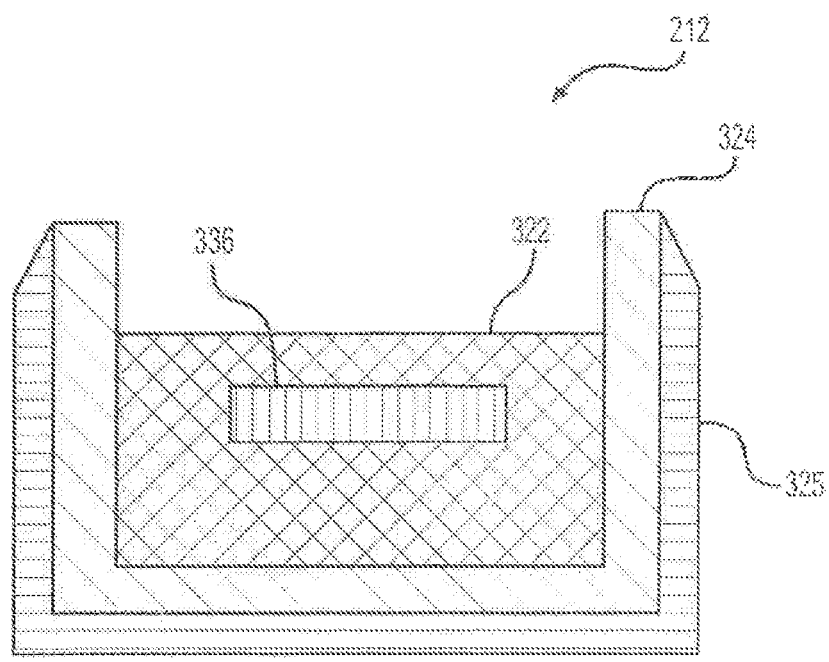
FIG. 3B illustrates an exemplary nebulizer, in accordance with the present disclosure.
Figure 3C:
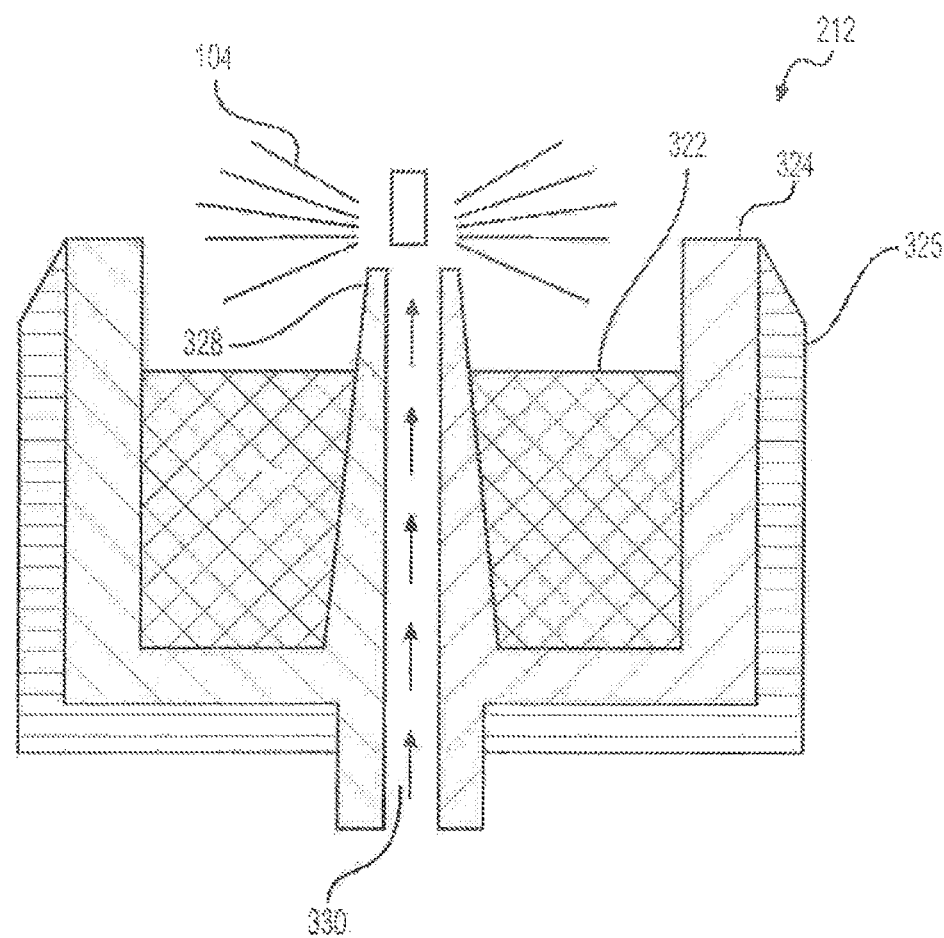
FIG. 3C illustrates an exemplary nebulizer, according to embodiments of the present disclosure.

FIG. 3C illustrates another exemplary nebulizer 212. Nebulizer 212 may include a nozzle 328 having channel and configured to eject a compressed gas 330. Nozzle 328 may mix liquid 322 with gas 330 and may spray micro droplets forming mist 104. In such embodiments, nebulizer 212 uses compressed gas 330 passing through liquid 322 to generate micro droplets of mist 104 from liquid 322.

In some embodiments, as shown in FIGS. 3A-3C, nebulizer 212 may include a heating element 325 to heat liquid 322 in reservoir 324. Heating element 325 may be used to increase the rate for generating mist 104 and/or to obtain desired properties of the micro droplets of mist 104 generated from liquid 322. Heating element 325 may not heat liquid 322 to a temperature above the boiling point of liquid 322 so that liquid 322 is not substantially vaporized. In some embodiments, liquid 322 may be heated to a temperature ranging, for example, from about 25° C. to about 60° C., from about 25° C. to about 40° C., from about 25° C. to about 50° C., from about 25° C. to about 70° C., from about 25° C. to about 30° C., or from about 25° C. to about 90° C.

Heating element 325 may also be included in chamber 210 to heat the air inside chamber 210 to a predetermined environmental temperature. The predetermined environmental temperature may vary depending on the material of object 100 and/or liquid 322 used to generate the micro droplets of mist 104. In some embodiments, to reach a desired smoothness and/or roughness of the surface of object 100, a higher environmental temperature may avow a faster polishing or smoothing process. The temperature of the air in chamber 210 may not exceed the lowest temperature among a glass transition temperature of the material of object 100, a melting temperature of the material of object 100, and a boiling temperature of liquid 322. The predetermined environmental temperature may range, for example, from about 25° C. to about 60° C., from about 25° C. to about 40° C. from about 25° C. to about 50° C., from about 25° C. to about 70° C., from about 25° C. to about 80° C., or from about 25° C. to about 90° C. depending on the specific process, the amount of time, the material and/or shape of a particular object 100, and/or a desired degree of smoothness for the surface of the particular object 100.

As described above, in some embodiments, vinyl acetal polymers may be used for making object 100. Vinyl acetal polymers are suitable for making object 100 at least due to their good solubility in alcohols, such as ethanol and isopropanol, and their good printability for additive manufacturing processes, such as FDM® or FFF. In some embodiments, exemplary vinyl acetal polymers used for making object 100 may be represented by the chemical structure schematically shown in FIG. 4.

Figure 4:
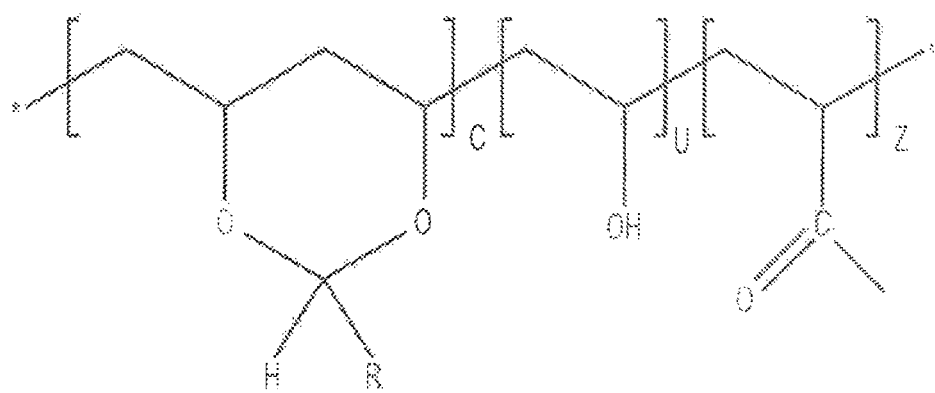
FIG. 4 is a schematic representation of the chemical structure of an exemplary polymer for making an object, according to embodiments of the present disclosure.

Vinyl acetal polymers are generally produced by a two-step chemical process: (1) hydrolyzing poly (vinyl acetate) to form polyvinyl alcohol), and (2) reacting poly(vinyl alcohol) with an aldehyde or mixed aldehydes to form predominantly 1,3-dioxane rings. The reactions are typically incomplete. Therefore, as shown in FIG. 4, acetal polymers are usually composed of a mixture of vinyl acetate units ("z"), vinyl alcohol units ("y"), and vinyl acetal units ("x"). The R group shown in FIG. 4 may depend on the aldehyde and may be any hydrocarbon group. In some embodiments, the R group may be selected, for example, from —H, —$CH_3$, —$C_2H_5$, —$C_3H_7$, and —$C_4H_9$. In one embodiment, the R group is —$C_4H_9$, and the resulting polymer is commonly referred to as poly(vinyl butyral) or PVB.

In some embodiments, object 100 may be made of PVB. PVB is composed of a mixture of vinyl acetate monomeric units, vinyl alcohol monomeric units, and vinyl butyral monomeric units (R=—$C_3H_7$) on its polymer backbone. The composition, i.e., weight fractions of the monomer components, may be adjusted to achieve desired properties. In some embodiments, the composition of PVB for making object 100 may include vinyl acetate (e.g., from 0 wt % to 5 wt %), vinyl alcohol (e.g., from 10 wt % to 30 wt %), and vinyl butyral (e.g., from 65 wt % to 90 wt %). In some embodiments, the composition of PVB for making object 100 may include vinyl acetate (e.g., from 0 wt % to 4 wt %), vinyl alcohol (e.g., from 15 wt % to 25 wt %), and vinyl butyral (e.g., from 71 wt % to 85 wt %). Example 1 described below illustrates an exemplary PVB material for 3D printing object 100.

Example 1

Preparation of an Exemplary PVB Material

Raw PVB resin (B05HX made by Chang Chun Group, in the form of a fine powder) was first hued in an oven at 60° C. for 4 hours. It was then dry-blended with 0.03% of an anti-oxidant (B215 from BASF) and 0.5% of titanium dioxide (R-902 from DuPont), and pelletized using a 20 mm twin-screw extruder.

The pellets were then dried at 60° C. for another 4 hours and gravity-fed to a 20 mm single-screw extruder to manufacture it into a filament. The temperatures used for manufacturing the PVB filament were shown in Table 1.

TABLE 1

| Exemplary processing temperatures | | | |
| --- | --- | --- | --- |
| Feed zone | Compression zone | Metering zone | Die |
| 90° C. | 160° C. | 220° C. | 190° C. |

The extrudate, pulled by a puller at a constant speed, was cooled in a water tank, and collected on a spool. The puller speed was set to draw the filament to a final diameter of about 1.75 mm. The spooled filament was then dried before printing object 100.

In some embodiments, the material for making object 100 disclosed herein may further comprise at least one additive, selected from, for example, colorants, pigments, dyes, fillers, fibers, plasticizers, nucleating agents, pharmaceutical agents, heat and/or UV stabilizers, process aids, impact modifiers, chemicals, ceramics, biomaterials, other suitable polymers, any suitable materials, or a combination thereof. Suitable additives may be incorporated by a variety of methods, for example, melt compounding. In some embodiments, the main polymer may still form the matrix or the continuous phase of the material after the addition of the at least one other ingredient.

Most FDM® or FFF printers for making object 100 may require the materials to be in the form of a filament, usually with a circular cross-section. The filaments may be produced by a melt extrusion process. In the melt extrusion process, fully dried raw materials, along with other ingredients, are fed into a polymer extruder (either single-screw or twin-screw) with a cylindrical die and are continuously extruded as an extrudate from a heated nozzle. The extrudate is subsequently quenched and/or cooled, and pulled by a puller to give the desired physical dimensions before being collected. The melt extrusion process may also include other suitable equipment, such as melt or gear pumps (to ensure a stable output), laser micrometers (for on-line measurement of the physical dimensions), or other suitable devices.

The filaments may have an average diameter with small variations. The average diameter of the filaments for making object 100 in an additive manufacturing process may range, for example, from about 0.5 mm to about 1 mm, from about 1 mm to about 1.75 mm, from about 1.75 mm to about 2.5 mm, from about 1.75 mm to about 3 mm, or from about 3 mm to about 5 mm. The variation of the filament diameters may be advantageously reduced to a small value, and may range from about ±0.05 mm to about ±0.15 mm, for example.

Various factors may affect the roughness of the surface of object 100 made using an additive manufacturing process, including e.g., the average diameter of filaments and/or the thickness of a layer deposited by the additive manufacturing process using the filaments. In one example, a larger average diameter of the filaments and/or a greater thickness of the layer may increase the difference between high and low points on the surface of object 100, which may increase the roughness of the surface of object 100. In another example, a smaller average diameter of the filaments and/or a smaller thickness of the layer may reduce the difference between the high and low points on the surface of object 100, which may reduce the roughness of the surface of object 100. However, a smaller average diameter of the filaments and/or a smaller thickness of the layer may increase the number of passes needed to manufacture object 100 by the additive manufacturing process, and thus may increase the time for manufacturing object 100.

The roughness, e.g., degree of roughness of the surface of object 100 may be measured before and after object 100 is subjected to the methods and/or processing disclosed in the present disclosure. Profilometry or other suitable methods may be used to measure the degree of roughness of the surface of object 100. Example 2 described below illustrate the measurement and comparison of the roughness of the surface of exemplary objects 100 before and after being processed.

Example 2

Measurement of the Roughness of the Surface of Exemplary Objects 100

A compounded material was prepared for making exemplary objects 100 by (1) manually mixing all of the ingredients as shown in Table 2 in the formulation (2) melt compounding the ingredients using a 20 mm co-rotating twin-screw extruder under the conditions listed in Table 3, and (3) manufacturing the compounded material into a filament with an average diameter of 1.75 mm via single-screw extrusion, under the extrusion conditions listed in Table 4.

TABLE 2

The formulation of a compounded material for making an exemplary object 100

|  | Content (phr*) |
| --- | --- |
| PVB (B05HX from Chang Chun Group) | 100 |
| Anti-Oxidant (B215 from BASF) | 0.3 |

TABLE 2-continued

The formulation of a compounded material for making an exemplary object 100

|  | Content (phr*) |
| --- | --- |
| Nitrile Rubber (P35 from OMNOVA Solutions) | 15 |

*"phr" means parts per hundreds of resin.

TABLE 3

Melt compounding conditions

|  | Feed Zone | $2^{nd}$ Zone | $3^{rd}$ Zone | $4^{th}$ Zone | Die | RPM |
| --- | --- | --- | --- | --- | --- | --- |
| Temperature (° C.) | 120 | 160 | 190 | 200 | 190 | 120 |

TABLE 4

Filament extrusion conditions

|  | Feed Zone | Compression Zone | Metering Zone | Die | RPM |
| --- | --- | --- | --- | --- | --- |
| Temperature (° C.) | 90 | 170 | 200 | 190 | 30 |

The resulted filament was used to print exemplary objects 100, i.e., 15 mm by 15 mm by 30 mm cuboids, as test specimens (0.2 mm layer height; shell number=2; 20% infill; printing temperature=210° C.). The test specimens were polished using an exemplary apparatus 200 that includes an exemplary vibrating mesh nebulizer 212 with an overall diameter of about 20 mm, a vibrating frequency of about 112 kHz, and about 850 holes with an average diameter of about 8 μm. Apparatus 200 had an internal volume of about 3 L. The polishing time was 20 min.

As-printed and polished specimens were tested for surface roughness using a roughness tester (Mitutoyo Surftech SJ400). Scanning of the surface of the specimens was performed in a direction parallel to the "z" direction (perpendicular to the layers). The results are shown below in Table 5.

TABLE 5

Comparison of surface roughness of processed and unprocessed specimens

|  | $R_a$ (μm) | $R_z$ (μm) |
| --- | --- | --- |
| As-printed | 15.65 | 95.9 |
| Polished (20 min) | 2.61 | 9.1 |

In Table 4, $R_a$ and $R_z$ are commonly used parameters indicating surface roughness. As described herein, $R_a$ refers to the arithmetic average of the absolute values of the distances between the peaks—both positive peaks and negative peaks (valleys)—and the medium line, and $R_z$ refers to the arithmetic mean value of the single roughness depths of consecutive sampling lengths. As shown in Table 4, the specimens polished or processed by apparatus 200 showed substantially improved surface smoothness and/or reduced surface roughness compared to the as-printed specimens.

Example 3 described below illustrate processing an exemplary object 100 using exemplary apparatus 200 in accordance with the present disclosure.

Example 3

Processing 3D-Printed Object 100 Using an Exemplary Apparatus 200

An exemplary apparatus 200 substantially similar to that shown in FIG. 2 was used. Apparatus 200 included an exemplary rotatable platform 213 for placing an exemplary 3D-printed 100, a nebulizing unit with two exemplary vibrating membrane nebulizers 212, and electrical circuits configured to power the nebulizing unit as well as the structural components.

An owl model (about 12 cm tall) was printed on a FlashForge Creator Pro desktop 3D printer using the filament prepared as described in Example 1, under the following printer settings: printing/nozzle temperature: 210° C.; build plate temperature: 60° C.; printing speed: 60 mm/s; layer height: 0.2 mm.

The printed owl model was processed or polished in apparatus 200 for about 40 min using isopropanol as an exemplary liquid 322. After processing or polishing, the owl model was removed from apparatus 200 and the surface of the owl model dried off under natural evaporation of isopropanol for several hours. The processed or polished 3D-printed object 100, the owl model, exhibited a much smoother and shiny surface compared to that before the processing by apparatus 200.

Figure 5A:
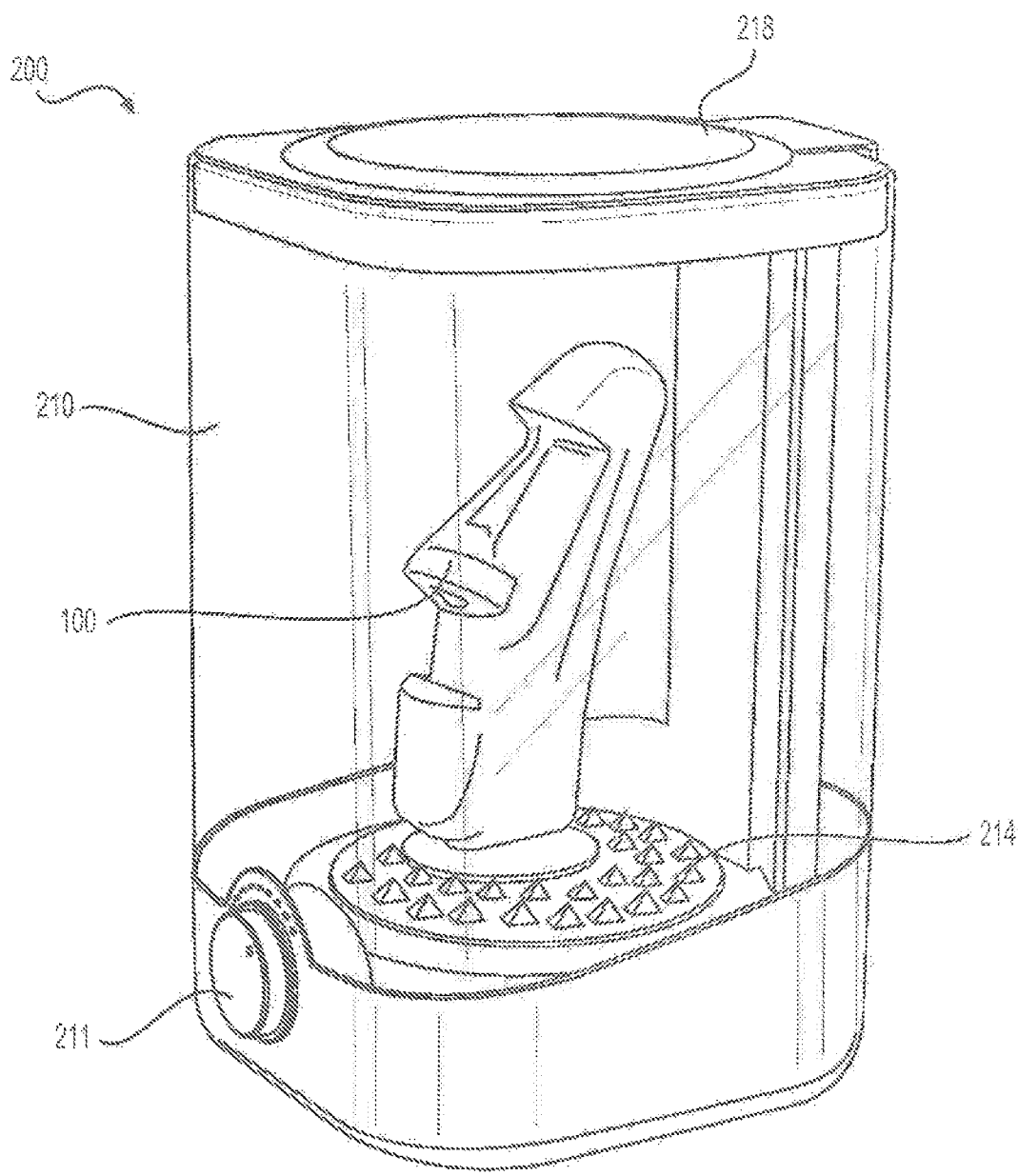
FIG. 5A illustrates a perspective view of an exemplary apparatus, according to embodiments of the present disclosure.
Figure 5B:
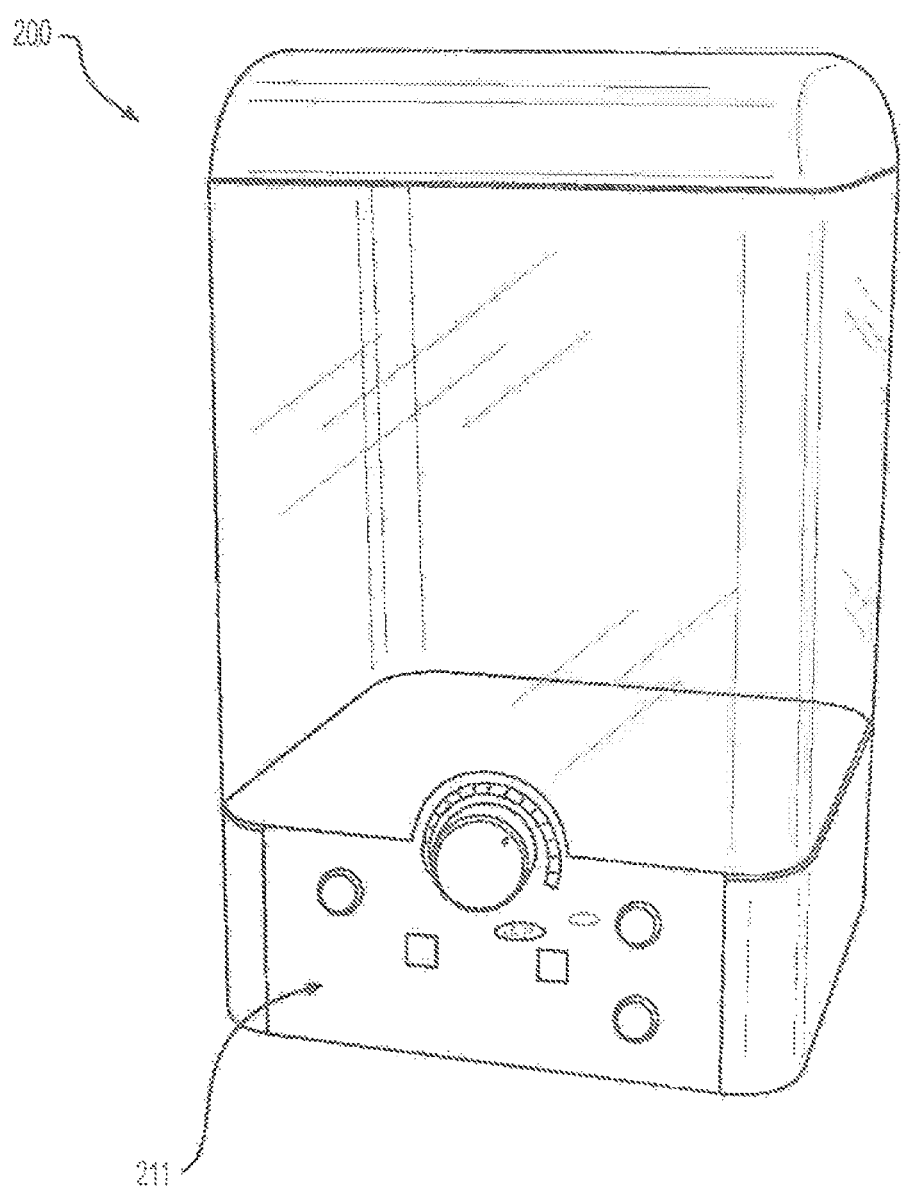
FIG. 5B illustrates a perspective view of an exemplary apparatus, according to embodiments of the present disclosure.
Figure 5C:
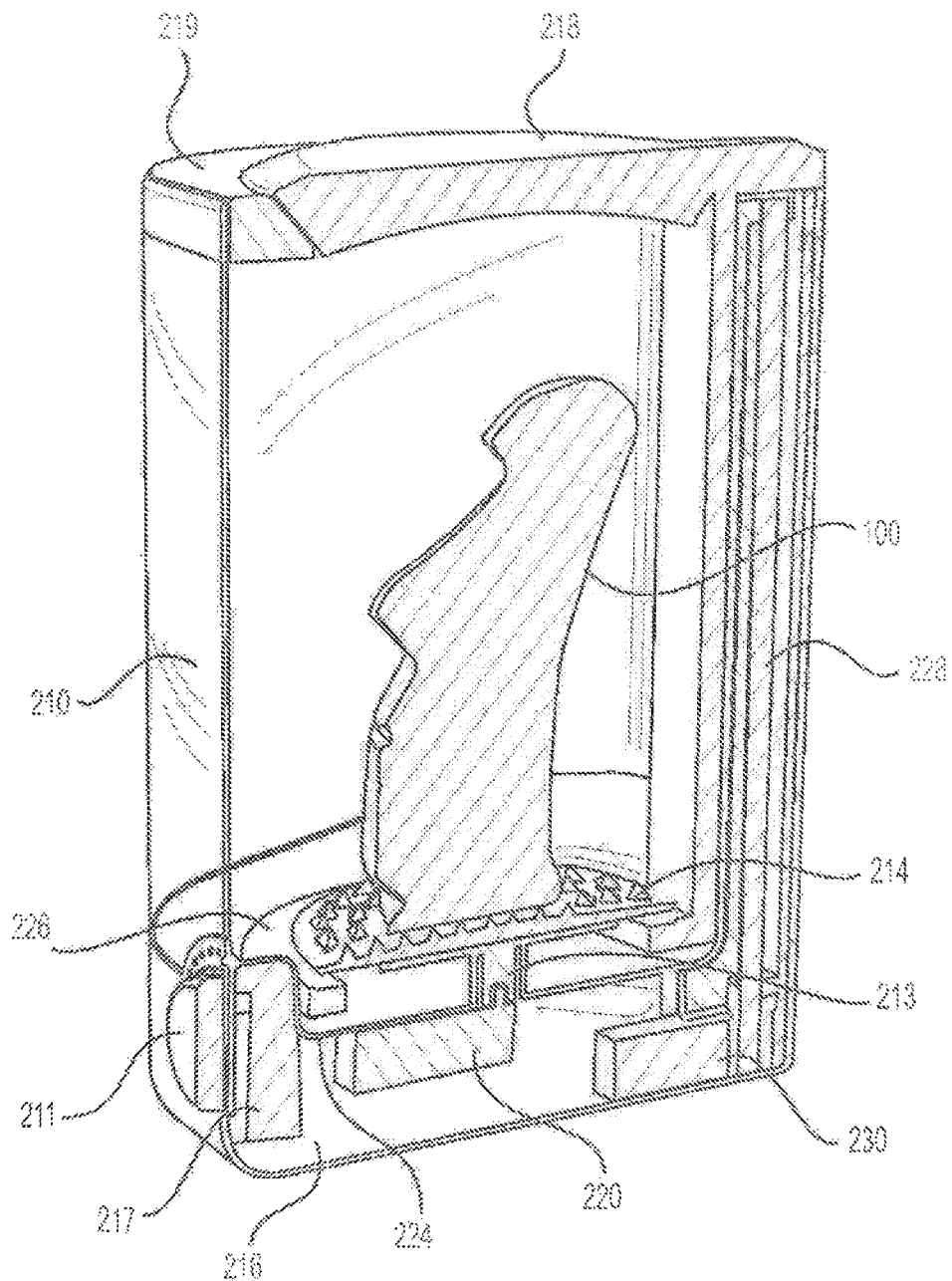
FIG. 5C illustrates a perspective view of a cross-section of an exemplary apparatus, according to embodiments of the present disclosure.

FIGS. 5A-C illustrate another exemplary apparatus 200 in accordance with the present disclosure. As shown in FIG. 5A, chamber 210 of apparatus 200 may have transparent or semi-transparent walls such that object 100 may be viewed by a user of apparatus 200. For example, the transparent or semi-transparent chamber 210 may allow the user to place object 100 on rotatable platform 213 or a fixture plate 214 at a suitable place, for example, the middle or adjacent nebulizer 212. The transparent or semi-transparent chamber 210 may allow the user to observe the progress of the processing of object 100, the generation, density, and/or distribution of mist 104 in chamber 210, the smoothness of the surface of object 100, the rotation of object 100 during processing, and/or any desirable or undesirable effect or situation during the processing of object 100.

In some embodiments, as shown in FIG. 5A, apparatus 200 may include user control 211. In some embodiments, user control 211 may be a rotary control knob such that that the operation of apparatus 200 may be switched among different settings by turning the knob. Each setting may correspond to an operation of apparatus 200, such as starting or terminating nebulizer 212. In some embodiments, as shown in FIG. 5B, user control 211 may include one or more buttons, each corresponding to a function or setting of one or more of the components of apparatus 200. In some embodiments, user control 211 may include one or more displays that indicate parameters for the processing of object 100, including, e.g., the duration of the processing, the environmental temperature, and/or humidity in chamber 210. In some embodiments, user control 211 may be a display having a graphical user interface and one or more settings for the operation of apparatus 200 may be selected from the interface. In other embodiments, user control 211 may be any suitable type of user interface for controlling and/or adjusting the operation of apparatus 200.

FIG. 5C illustrates a cross-section of the exemplary apparatus 200 shown in FIG. 5A. As shown in FIG. 5C, in some embodiments, apparatus 200 may include one or more control circuits 217. Control circuits 217 may be electrically connected to user control 211, nebulizer 212, and/or other components of apparatus 200 to be described further below. In some embodiments, control circuits 217 may receive one or more electrical signals according to an adjustment or setting of user control 211, e.g., turning a rotary control knob to a setting position or pressing a button. Control circuits 217 may send electrical signals, such as a current, a current pulse, a voltage level, a voltage pulse, or a transient voltage level to a suitable component of apparatus 200, such as nebulizer 212. Upon receiving an electrical signal from control circuits 217, for example, nebulizer 212 may start generating mist 104 or stop generating mist 104.

In some embodiments, fixture plate 214 may be removably or fixedly placed on top of rotatable platform 213 such that fixture plate 214 may rotate in the same motion as rotatable platform 213 and/or rotational motor 220. Fixture plate 214 may be a separate part from rotatable platform 213 or an integrated part with rotatable platform 213. Object 100 may be removably placed and/or temporarily fixed on fixture plate 214 during the processing such that object 100 may rotate in the same motion as fixture plate 214 and rotatable platform 213.

In some embodiments, as shown in FIGS. 5A-5C, chamber 210 may include a lid 218. Lid 218 may include one or more seals along its perimeter to create a sealing of chamber 210 when lid 218 is closed. Lid 218 may be opened or closed manually or automatically. For example, lid 218 may be opened to receive object 100 into chamber 210 or to allow object 100 to be taken out of chamber 210. In some embodiments, lid 218 may include a motor that is electrically connected to control circuits 217. In some embodiments, lid 218 may be closed before nebulizer 212 start generating mist 104. In some embodiments, lid 218 may be opened after nebulizer 212 stops generating mist 104 and/or after mist 104 substantially is reduced or disappears. In some embodiments, lid 218 may be automatically closed before the processing of object 100 starts and/or may be automatically opened after the processing of object 100 ends. The operation of lid 218 may be coordinated with the processing of object 100 and/or the operation of other components of apparatus 200, for example, nebulizer 212.

In some embodiments, as shown in FIG. 5C, apparatus 200 may include a plate 224 between chamber 210 and chamber 216. Rotatable platform 213 may be placed on top of plate 224 or may be installed in an opening of plate 224. In some embodiments, nebulizer 212 may be installed on plate 224 and plate 224 may be located between chamber 210 and reservoir 324. In some embodiments, some regions of plate 224 may have porous membrane 215 or a plurality of openings, which may allow the micro droplets of mist 104 in chamber 210 to pass, such as flow, diffuse, and/or disperse, through into chamber 216 and/or reservoir 324.

As described above and shown in FIG. 5C, apparatus 200 may include rotational motor 220. Rotational motor 220 may be removably or fixedly coupled to rotatable platform 213. Rotational motor 220 may be electrically connected to control circuits 217 and may be configured to receive electrical signals from control circuits 217. The operation of rotational motor 220, e.g., duration and speed of rotational motor 220, may be adjusted or controlled by user control 211, and may be coordinated with the operation of nebulizer 212. In one example, rotational motor 220 may start to operate when the processing of object 100 starts or nebulizer 212 starts. In another example, rotational motor 220 may stop to operate when the processing of object 100 ends or nebulizer 212 stops. In some embodiments, the rotational speed of rotational motor 220, and thus that of rotatable platform 213 and/or fixture plate 214, may be adjusted or controlled by user control 211 before or during the processing of object 100.

In some embodiments, user control 211 may be adjusted based on an observation of object 100 and/or the environment in chamber 210, such as the density and/or distribution of mist 104. For example, user control 211 may be adjusted to regulate and/or to control the processing of object 100, such as to stop nebulizer 212 from generating mist 104 when the smoothness of object 100 observed is satisfactory or to start nebulizer 212 to generate mist 104 when the smoothness of object 100 observed is not satisfactory. In some embodiments, based on the observation of the surface of object 100, user control 211 may be adjusted to start rotational motor 220 and/or to increase the rotational speed of rotational motor 220 to improve the evenness of the distribution of mist 104 surrounding object 100 and/or the evenness of the smoothness of the surface of object 100. In other embodiments, user control 211 may be adjusted to stop rotational motor 220 and/or to reduce the rotational speed of rotational motor 220.

In some embodiments, nebulizer 212 may have different operation modes to generate mist 104. For example, nebulizer 212 may generate a continuous flow of mist 104, or a discontinuous flow of mist 104, such as an intermittent, a pulsatile, or randomly generated bursts of mist 104. In one aspect, nebulizer 212 may generate a series of intermittent or pulsatile bursts of mist 104 for a predetermined amount of time. In another aspect, nebulizer 212 may generate a continuous flow of mist 104 for a first amount of time and intermittent bursts of mist 104 for a second amount of time. The bursts of mist 104 may be before and/or after the continuous flow of mist 104. In some embodiments, nebulizer 212 may operate at an operation mode or a sequence of operation modes preprogramed in control circuits 217. For example, control circuits 217 may include a memory device that stores one or more predetermined instructions for the operation of nebulizer 212. Control circuits 217 may include one or more processing circuits configured to execute the instructions to allow nebulizer 212 to perform one or more operation modes for a period of time, e.g., by adjusting electrical signals sent to nebulizer 212 or a driver circuit of nebulizer 212. In some embodiments, control circuits 217 may include a timer circuit that records the total duration for the operation of nebulizer 212, a duration for a continuous operation of nebulizer 212, and/or a time interval between intermittent operations of nebulizer 212.

In some embodiments, nebulizer 212 may operate at an operation mode or a sequence of operation modes in response to a setting received from user control 211. In some embodiments, according to the setting of user control 211, nebulizer 212 may generate mist 104 in a selected operation mode or a selected Sequence of operation modes stored in the memory device of control circuits 217. In some embodiments, nebulizer 212 may operate at different modes or a sequence of operation modes to generate mist 104 to obtain a satisfactory distribution of the micro droplets of mist 104 and/or a satisfactory evenness of the smoothness of the surface of object 100.

Increasing the uniformity of the distribution of the micro droplets of mist 104 in chamber 210 and/or the distribution of the micro droplets of mist 104 surrounding object 100 may increase the evenness and/or uniformity of the smoothing of the surface of object 100 (e.g., evenness and/or uniformity of smoothness or a degree of smoothing of the surface of object 100). The intermittent or pulsatile bursts of mist 104 may create and/or increase turbulence in the air in chamber 210, which may increase the uniformity of the distribution of the micro droplets of mist 104 in chamber 210 and may thus increase the uniformity or evenness of the smoothing of the surface of object 100 after the processing by apparatus 200.

In some embodiments, as shown in FIGS. 5A, 5C, 6A, and 6B, apparatus 200 may include a lifting mechanism that may move object 100 into and out of chamber 210. The lifting mechanism of apparatus 200 may include at least one of a lifting arm 228. Lifting motor 230 may be electrically connected to control circuits 217. In some embodiments, lifting motor 230 and/or lifting arm 228 may operate according to an input received from user control 211, e.g., a setting to start or terminate nebulizer 212. In other embodiments, lifting motor 230 and/or lifting arm 228 may operate in coordination with other components of apparatus 200. For example, lifting motor 230 and lifting arm 228 may start performing linear motion when nebulizer 212 starts or stops to operate, or when the processing of object 100 starts or ends. The linear motion of lifting arm 228 may include moving upwards to raise object 100, e.g., from an initial rest position inside chamber 210 to a second rest position where object 100 is presented out of chamber 210, and may include moving downwards to lower object 100, e.g., from the second rest position towards the initial rest position. During the movement of lifting arm 228, lifting motor 230 may stay at a base location of apparatus 200.

In some embodiments, lifting motor 230 may be a manually operated linear actuator that combines a rotational arm and a mechanical actuator that converts the rotary motion of the rotational arm into linear motion of lifting arm 228. For example, a user may manually rotate the rotational arm and then the mechanical actuator converts the rotary motion of the rotational arm to linear motion of lifting arm 228 to raise or lower object 100.

Figure 6A:
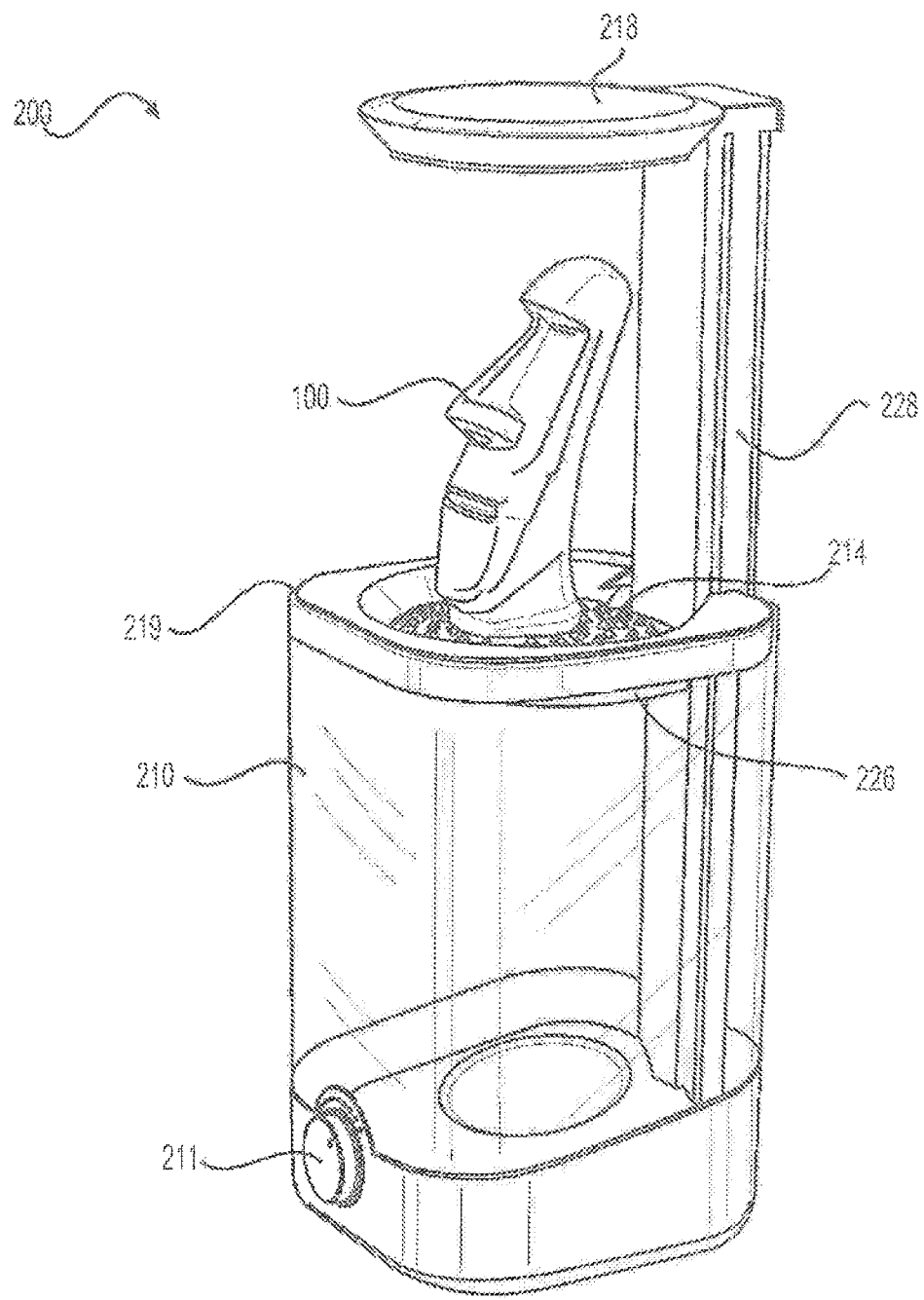
FIG. 6A illustrates a perspective view of an exemplary apparatus, according to embodiments of the present disclosure.
Figure 6B:
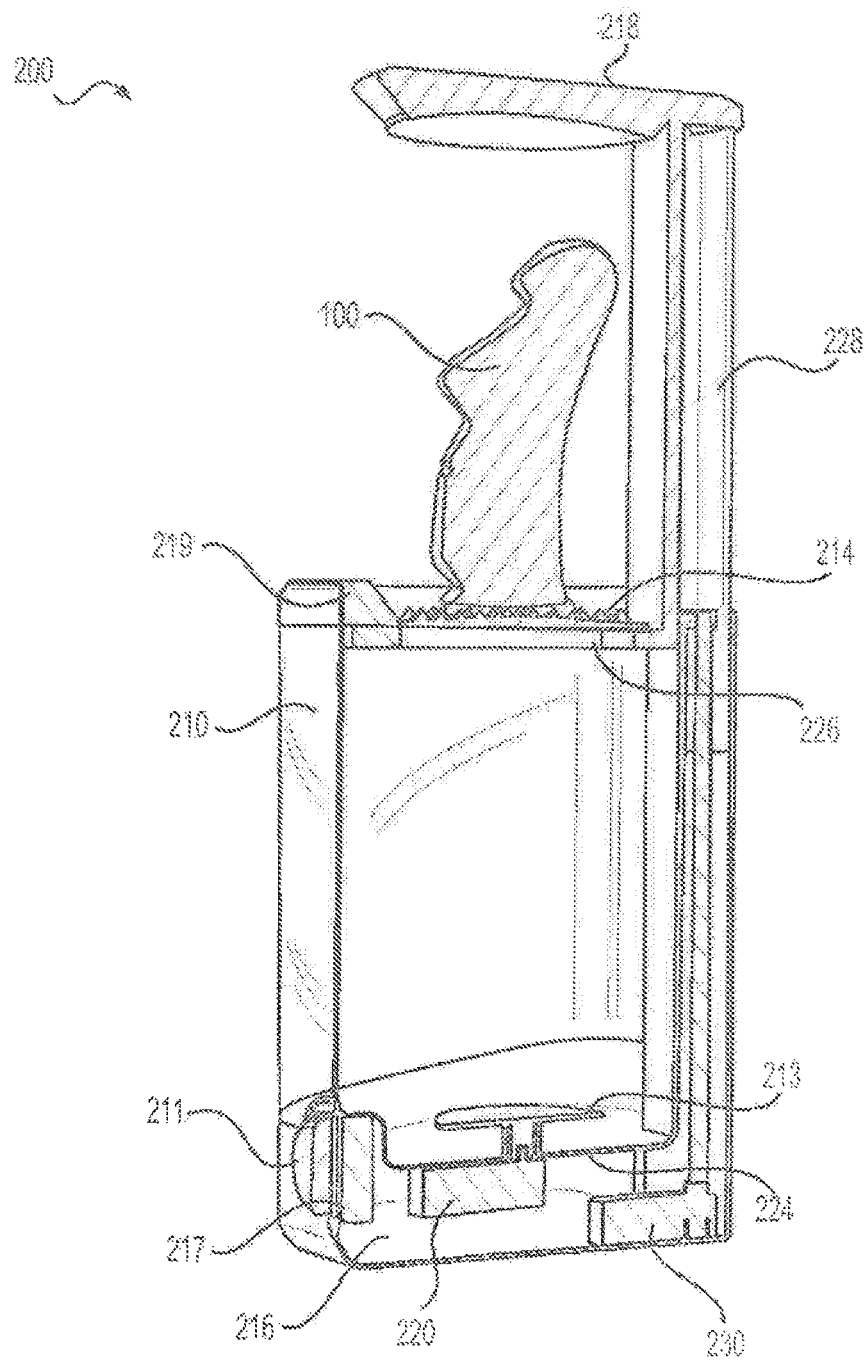
FIG. 6B illustrates a perspective view of a cross-section of an exemplary apparatus, according to embodiments of the present disclosure.

In some embodiments, as shown in FIGS. 5C, 6A, and 6B, lifting arm 228 may be connected to lid 218. Lid 218 may move in the same linear motion as lifting arm 228. As shown in FIG. 5C, when lifting arm 228 is at a first rest position, lid 218 is closed and may form a seal with a top cover 219 of chamber 210. As shown in FIGS. 6A and 6B, when lifting arm 228 is at a second rest position, lid 218 is moved away from top cover 219.

In some embodiments, as shown in FIGS. 5C, 6A, and 6B, lifting arm 228 may be connected to lifting plate 228. Lifting plate 226 may move in the same linear motion as lifting arm 228. Lifting plate 228 may be, for example, donut-shaped or ring-shaped and may have an inner perimeter and an outer perimeter. The inner perimeter of lifting plate 226 may be smaller than the outer perimeter of fixture plate 214 and larger than the outer perimeter of rotatable platform 213. As shown in FIG. 5C, when lifting arm 228 is at the initial rest position, lifting plate 226 may surround the rotatable platform 213 and/or may be at least partially located beneath an edge area of fixture plate 214. Lifting plate 226 may engage with fixture plate 214 and/or rotatable platform 213 to raise or lower object 100 in a linear vertical motion.

In some embodiments, object 100 placed on fixture plate 214 may move upwards or downwards in the same motion as lifting plate 226 and lifting arm 228. For example, when lifting plate 226 moves upwards with lifting arm 228, fixture plate 214 may engage at least partially with a top surface of lifting plate 226 and/or may temporarily be releasably connected to lifting plate 226 such that fixture plate 214 may be supported by lifting plate 226. In such instances, as lifting plate 226 moves upwards, fixture plate 214 may move upwards together with lifting plate 226 and away from rotatable platform 213. The upward movement of lifting plate 226 and lifting arm 228 may be stopped at the second rest position where lifting plate 226 meets or abuts top cover 219 of chamber 210. As lifting plate 226 moves downwards with lifting arm 228, fixture plate 214 may move downwards toward rotatable platform 213 until lifting arm 228 moves back to the first rest position. At this initial rest position, lifting plate 226 may disengage with and be moved away from fixture plate 214, which may be then removably placed on and/or connected to rotatable platform 213.

Lifting arm 228, lifting motor 230, lifting plate 226, and/or lid 218 may be controlled by control circuits 217 and may be coordinated with the processing of object 100. For example, before processing of object 100, fixture plate 214 may be lifted away from rotatable platform 213 and lid 218 may be moved away from top cover 219 to a position prepared to receive object 100. Object 100 may be then received on fixture plate 214, which may be lowered back to rotatable platforms 213 and lid 218 may be closed. Nebulizer 212 then may start generating mist 104 and processing of object 100 may start. After processing of object 100, fixture plate 214 may be again lifted away from rotatable platform 213 and lid 218 may again be moved away from top cover 219, presenting processed object 100 out of chamber 210 for inspection and/or retrieval. In some embodiments, apparatus 200 may automatically perform the operation of the lifting mechanism by performing a sequence of instructions saved in the memory device of control circuits 217. In other embodiments, the operation of the lifting mechanism may be performed manually at the suitable time point.

The lifting mechanism may advantageously reduce the need to remove chamber 210, keep chamber 210 remain substantially sealed, reduce or limit the evaporation of liquid 322 from chamber 216 or reservoir 324, and/or may reduce or limit the release of mist 104 out of chamber 210. In some embodiments, even when lid 218 is open, during the placement and retrieval of object 100 after the processing of object 100. This lifting mechanism may offer a convenient way to place object 100 inside of chamber 210, e.g., onto fixture plate 214 or rotatable platform 213, and to retrieve object 100 out of chamber 210, e.g., from fixture plate 214 or rotatable platform 213. In some embodiments, the linear movement of object 100 by the lifting mechanism may increase the removal of residue liquid 322 on the surface of object 100 after the processing by allowing the residue liquid 322 to drip away and/or evaporate during the movement.

Figure 7B:
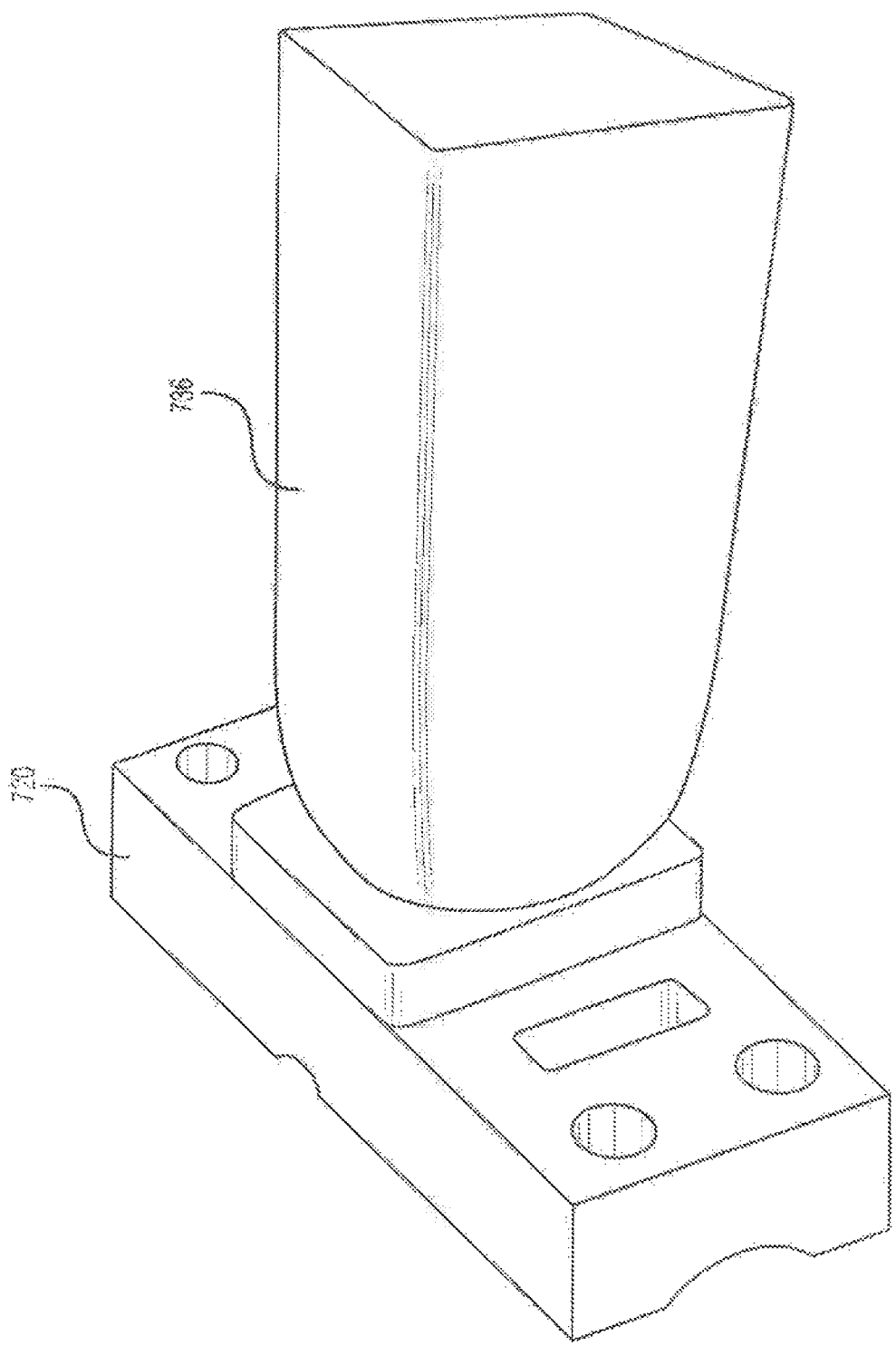
FIG. 7B illustrates a perspective view of part of an exemplary nebulizer, according to embodiments of the present disclosure.

FIG. 7A illustrates another exemplary nebulizer 212 for generating mist 104 in apparatus 200. In some embodiments, as shown in FIG. 7A, nebulizer 212 may include a cartridge 700 holding a nebulizer assembly 730. Cartridge 700 may include a top part 710 and a bottom part 720. In some embodiments, top part 710 and bottom part 720 may be releasably fitted together via, e.g., friction fit, press fit, twist fit, snap fit, overmolding or molding, thermal bonding, and/or welding. In some embodiments, top part 710 and bottom part 720 may be fixedly fitted together, for example, via an adhesive or a screw mechanism. For example, top part 710 and bottom part 720 may comprise a set of complementary screw threads such that top part 710 may be fastened to bottom part 720 by screwing one or more screws into bottom part 720. In some embodiments, top part 710 and bottom part 720 may have one or more external recesses, e.g., recesses 716 and 728, to increase the convenience for a user to grab, carry, or assemble cartridge 700 and/or nebulizer assembly 730.

The structure of top part 710 and bottom part 720 may be designed and configured to hold nebulizer assembly 730 at least in part, in cartridge 700, and to allow mist 104 to exit from nebulizer assembly 730. Cartridge 700 may include a fitting part 740 that engages with bottom part 720, for example, to stabilize and/or fix nebulizer assembly 730 in cartridge 700.

In some embodiments, top part 710 may include a rim 712 and an opening 714. Rim 712 may have a truncated funnel shape. In some embodiments, opening 714 may have a geometric shape, such as a circle or an ellipse. In other embodiments, opening 714 may have a tubular shape, such as a cylinder having a cylindrical wall. For example, opening 714 may be circular or elliptical, and may be surrounded by a cylindrical wall. Rim 712 may be formed above opening 714 and/or above the wall of opening 714. In some embodiments, the inner perimeter of the bottom of rim 712 may be smaller than the inner perimeter of opening 714. In other embodiments, opening 714 and rim 712 may be any suitable geometric shape and/or size.

In some embodiments, bottom part 720 may include one or more fitting portions to fit top part 710 and nebulizer assembly 730. In some embodiments, bottom part 720 may include a first chamber 722, a second chamber 724, and a fitting edge 726. First chamber 722 may have a geometric shape sized substantially complementary to that of opening 714 of top part 710. For example, the inner perimeter of first chamber 722 may be about the same as the outer perimeter of opening 714. In such situations, top part 710 may engage with bottom part 720 via, e.g., friction fit, press fit, twist fit, snap fit, overmolding or molding thermal bonding, and/or welding between the inner surface of first chamber 722 and the outer surface of a wall of opening 714.

In some embodiments, nebulizer assembly 730 includes one or more components, such as a piezoelectric vibrating element 731, a mesh 732, a coupler 734, and a wick 736. The perimeter of vibrating element 731 may be the same as that of the inner perimeter of first chamber 722. Vibrating element 731 may have an edge portion 733 that may rest upon a bottom edge 723 of first chamber 722. In some embodiments top part 710 may be pushed and/or twisted against bottom part 720 until the wall of opening 714 abuts edge portion 733 of vibrating element 731 or bottom edge 723 of first chamber 722. Vibrating element 731 may have a ring shape with a hole in the middle and mesh 732 may be installed in the hole or may cover the hole. In some embodiments, mesh 732 and vibrating element 731 are one integrated part. In some embodiments, coupler 734 may be placed in second chamber 724 of bottom part 720, and may have a top surface 735 and a bottom surface 737. Coupler 734 may be in contact with vibrating element 731 and/or mesh 732 on top surface 735 and may be in contact with wick 736 on bottom surface 737. Mesh 732, coupler 734, and wick 736 are configured to be in fluid communication. During the operation of nebulizer assembly 730, a distal end 738 of wick 736 is submerged in liquid 322 such that liquid 322 is transported and supplied to coupler 734 and/or mesh 732 in a substantially continuous fashion.

In some embodiments, fitting part 740 allows coupler 734 and wick 736 to be held in place in cartridge 700. In one example, fitting part 740 may include an inner tube 743 that has a perimeter substantially the same as or smaller than that of the outer perimeter of wick 736. Fitting part 740 may engage with wick 736 via any suitable means, e.g., friction fit, twist fit, thermal bonding, and/or welding. Fitting part 740 may abut bottom surface 737 of coupler 734, and may engage with bottom part 720 via any suitable means, e.g., friction fit, press fit, twist fit, snap fit, overmolding or molding, thermal bonding, and/or welding. For example, fitting part 740 may include one or more springy cantilevers and may be pushed and/or twisted through wick 736 and/or against fitting edge 726 until the cantilevers pass and rest on fitting edge 726. In other embodiments, nebulizer 212 may include any suitable means to fix nebulizer assembly 730 in cartridge 700.

Vibrating element 731 may vibrate, e.g., contract or expand, bending upwards or downwards, upon being applied of an electric current or voltage. Mesh 732 may vibrate along with vibrating element 731. During vibration, mesh 732 may generate micro droplets of mist 104 from liquid 322 transported to mesh 732 by coupler 734 and/or wick 732. Mesh 732 may be made of a porous material that has several hundred to several thousand of pores or holes with average diameters ranging from about 1 μm to about 10 μm, from about 1 μm to about 8 μm, from about 1 μm to about 6 μm, from about 1 μm to about 4 μm, from about 2 μm to about 6 μm, from about 4 μm to about 8 μm, from about 4 μm to about 10 μm, or from about 6 μm to about 10 μm. In other embodiments, mesh 732 may have any suitable number and/or surface density of holes or pores sufficient to generate the desired size and/or density of micro droplets of mist 104.

In some embodiments, wick 736 may be made of a material that absorbs liquid 322 from chamber 216 or reservoir, and draws up absorbed liquid 322 to mesh 732 and/or coupler 734 via capillary action. In some embodiments, wick 736 may be made of a material that has pores and/or channels, such as a sponge material or a foamed plastic polymer, e.g., polyester, PVA, cotton fibers, or cellulose fibers. In other embodiments, wick 732 may be made of a non-porous material, e.g., carbon fibers. In other embodiments, wick 732 may be a thin tube. The material of wick 732 may not substantially affect or react with liquid 322.

Nebulizer assembly 730 may operate with or without coupler 734. When coupler 734 is not used, an amount of space between mesh 732 and wick 736 may affect the vibration of mesh 732 and/or vibrating element 731. For example, when the space between mesh 732 and wick 736 is reduced, vibrating element 731 and/or mesh 732 may contact wick 736 as it vibrates, e.g., bending upwards and downwards. Such contact may apply or may increase a pressure on mesh 732 and/or vibrating element 731, which may affect the normal vibration of mesh 732 and/or vibrating element 731 and may eventually affect normal generation of mist 104, e.g., disrupting or reducing the generation of mist 104. When the space between mesh 732 and wick 736 is increased, wick 736 may not contact and may be away from vibrating element 731 and/or mesh 732 such that transportation and/or supply of liquid 322 to mesh 732 may be affected, which may also affect the generation of mist 104. Thus, the amount of space between mesh 732 and wick 736 needs to be suitably designed and placed. For example, a suitable amount of space tailored to allow wick 736 to minimally contact vibrating element 731 and/or mesh 732. However, such configuration for the placement of wick 736 and vibrating element 731 and/or mesh 732 may increase the complexities for assembling nebulizer assembly 730 and/or may reduce the consistency of nebulizer assembly 730 in generating mist 104.

To reduce the complexities in designing nebulizer assembly 730 and/or to improve the consistency of the operation of nebulizer assembly 730, coupler 734 may be advantageously added between vibrating element 731 and wick 736. Coupler 734 may be made of a soft material that may deform when applied with a pressure and may resume its form when the pressure is removed. Coupler 734 may absorb the pressure applied by vibrating element 731, mesh 732, and/or wick 736. Coupler 734 may also increase a distribution of pressure absorbed from vibrating element 731, mesh 732, and/or wick 736. Thus, coupler 734 may reduce the impact of wick 736 on vibrating element 731 and/or mesh 732 by resiliently deforming and reforming during the movement of vibrating element 731 and/or mesh 732. In one example, when the vibrating element 731 and/or mesh 732 bends downward and applies a pressure to top surface 735, coupler 734 deforms, and when the vibrating element 731 and/or mesh 732 bends upward and relieves the pressure on top surface 735, coupler 734 reforms. Due to the resilient nature of the material of coupler 734, the changes of the forms of coupler 734 may not substantially affect the contact and/or the pressure between top surface 735 and vibrating element 731 and/or mesh 732, and/or may not substantially affect the contact and/or the pressure between bottom surface 737 and wick 732. In such instances, transportation and/or supply of liquid 322 from wick 732 to mesh 732 may not be substantially affected and the operation of nebulizer assembly 730 may not be substantially affected. Thus, coupler 734 may facilitate the transport of liquid 322 to mesh 732, and may improve the operation nebulizer assembly 730 for generating mist 104.

The material of coupler 734 may be described as a foamy material, a squishy material, a resilient material, and/or a resiliently deformable material. Any suitable material that has the properties discussed above and also conducts liquids via capillary action may be used for coupler 734. For example, coupler 734 may be made of any suitable material selected from materials with foam-like textures, soft sponge materials, e.g., melamine sponge, resilient cloth wadding, or cotton pad. The material of coupler 734 may not substantially affect, dissolve in, and/or react with liquid 322. In some embodiments, coupler 734 may be made with the same material as that of wick 736 described above. In other embodiments, wick 736 may be made with the same material as that of coupler 734 described above.

As shown in FIG. 7B, in some embodiments, coupler 734 and wick 736 may be one integrated part. The material of the integrated part may be made of the material of coupler 734 described above. The integrated part may be fit into bottom part overmolding or molding, thermal bonding, and/or welding. In such instances, as shown in FIG. 7B, fitting edge 726 and fitting part 740 may not be needed to engage integrated wick 736 and coupler 734 with bottom part 720. Wick 736 and coupler 734 may have any suitable shape, e.g., cylindrical, rectangle, polygonal, etc. The softness, compliance, or deformability of the material of coupler 734 allows any shape of coupler 734 fit in chamber 724 of bottom part 720, via, e.g., friction fit, squeeze fit, press fit, twist fit, snap fit, overmolding molding, thermal bonding, and/or welding. The body of wick 736 or the integrated part of wick 736 and coupler 734 may be consistent in size along the length of its length or may vary, e.g., taper and/or flare. The integration of the wick 736 and coupler 734 simplifies the design of the nebulizer assembly 730, and reduces the impact of the pressure between wick 736 and coupler 734 on the generation of mist 104 by nebulizer assembly 730.

Nebulizer assembly 730 may further include a driver circuit 750 fitted in a chamber formed by top part 710 and bottom part 720. In some embodiments, vibrating element 731 may have two electrical connections with driver circuit 750. Vibrating element 731 may vibrate, e.g., contract or expand, according to electrical signals, e.g., electric current or voltage, it receives from driver circuit 750. In some embodiments, driver circuit 750 may be electrically connected to control circuits 217 such that the operation of vibrating element 731 may be controlled or adjusted by control circuits 217 and/or user control 211. In one example, electric current generated by driver circuit 750 to be supplied to vibrating element 731 may be adjusted Or controlled by control circuits 217. In another example, when user control 211 receives an input, e.g., a setting to start processing object 100, control circuits 217 may determine an operation mode of nebulizer 212, and may send one or more continuous, pulsatile, or intermittent electrical signals, e.g., current and voltage, to driver circuit 750, which are then supplied to vibrating element 731. Vibrating element 731 may vibrate in a continuous, an intermittent, or in a pulsatile mode corresponding to the electrical signals it receives. In some embodiments, the magnitude of vibration of vibrating element 731 may depend on the magnitude of the electrical signal it receives from driver circuit 750, which may be adjusted or controlled by control circuits 217. For example, when user control 211 receives an input, e.g., a setting to start processing object 100, control circuits 217 may determine a magnitude of the electrical signal sent to driver circuit 750 which may send a corresponding electrical signal to vibrating element 731.

In some embodiments, vibrating element 731 may vibrate at a predetermined frequency according to stored parameters in the memory device in control circuits 217 and/or an input from user control 211. In some embodiments, the frequency at which vibrating element 731 operates rosy depend on the piezoelectric material of vibrating element 731. In some embodiments, vibrating element 731 may vibrate at a frequency ranging from about 100 kHz to about 200 kHz. In some embodiments, the amount, size, and/or density of the micro droplets of mist 104 may vary depending on the frequency at which vibrating element 731 operates.

In some embodiments, nebulizer assembly 730 may be disposed after a number of uses and may be replaced with a new set of nebulizer assembly 730. In outer embodiments, nebulizer assembly 730 may be disposed together with cartridge 700 after a number of uses, and both may be replaced. In other embodiments, one or more of the components of nebulizer assembly 730, such as vibrating element 731, coupler 734, mesh 732, and/or wick 736, may be disposed after a number of uses and may be replaced.

Figure 8:
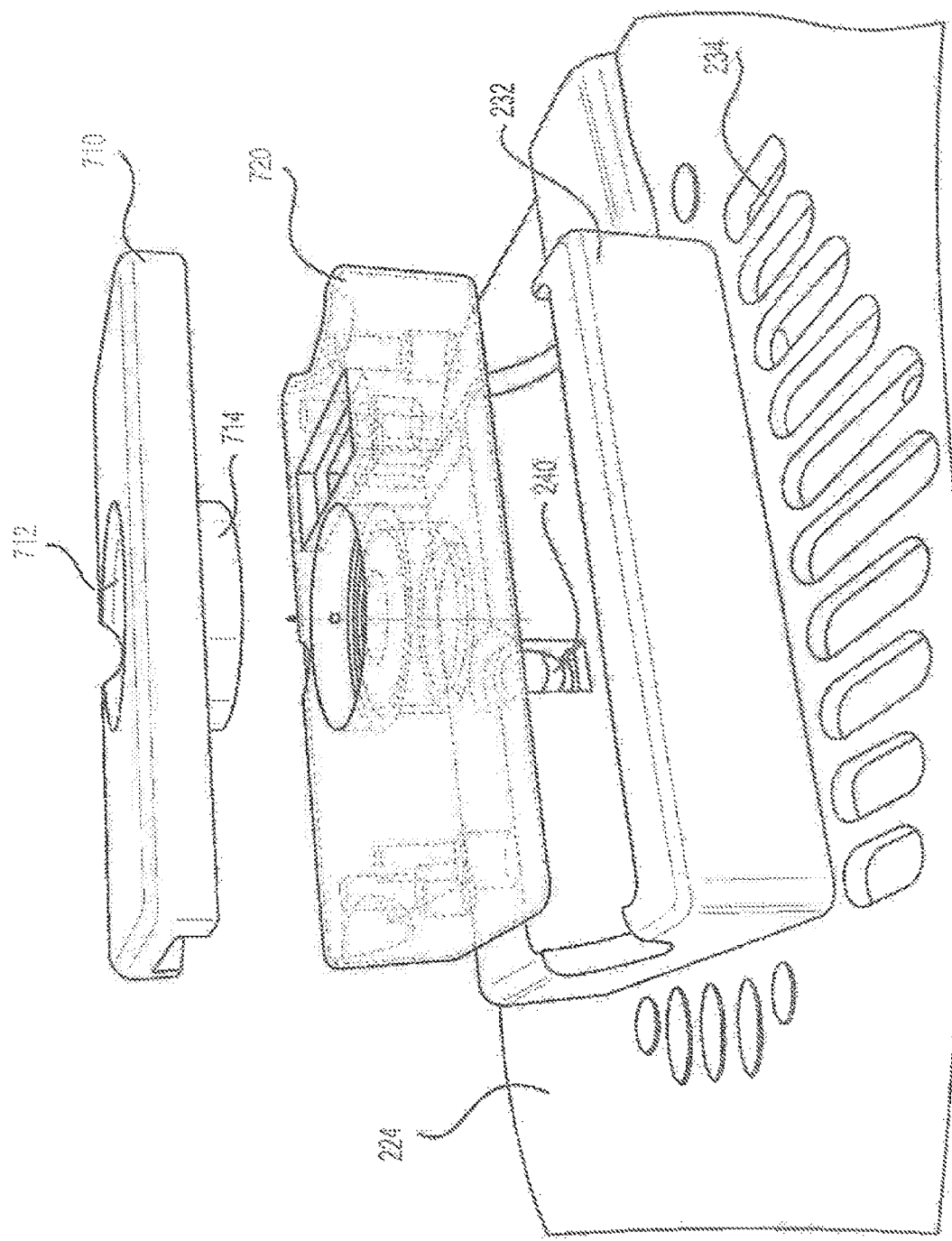
FIG. 8 illustrates an exploded view of an exemplary cartridge, according to embodiments of the present disclosure.

In some embodiments, as shown in FIG. 8, cartridge 700 may be placed in a fixture 232 on plate 224. The shape of fixture 232 may be substantially complementary to that of top part 710 and/or bottom part 720. Fixture 232 may be releasably or fixedly fitted together with top part 710 and/or bottom part 720 via, e.g., friction fit, press fit, twist fit, snap fit, overmolding or molding, thermal bending, welding, and/or via an adhesive or a screw mechanism. For example, bottom part 720 may be pushed, twisted against, and/or may abut a bottom edge of fixture 232, and may, additionally or alternatively, be fastened to fixture 232 by screwing one or more screws through bottom part 720 into fixture 232.

In some embodiments, plate 224 may have a concave surface curved towards chamber 216 and/or reservoir 324. In some embodiments, as shown in FIG. 8, plate 224 may include one or more openings 234 distributed on the surface of curved plate 224. For example, openings 234 may be distributed at a lower location on the surface of plate 224 such that micro droplets of mist 104 that are condensed in chamber 210 may accumulate on plate 224 at the lower location and then be recollected to chamber 216 or reservoir 324 through openings 234. Such design of plate 224, e.g., having curved surface and openings 234, may increase the efficiency of using liquid 322 and may reduce the amount of liquid 322 used for processing object 100.

In some embodiments, fixture 232 may include one or more LEDs 240 that may illuminate mist 104 and/or object 100. LED 240 may be a single color LED or a multi-color LED. LED 240 may be electrically connected to control circuits 217 and/or the driver circuit 750, which may adjust or control the operation of LED 240. For example, the selection of the color of illumination by LED 240 may be stored in the memory device of control circuits 217. In some embodiments, LED 240 may be adjusted or controlled according to an input received by user control 211. For example, when user control 211 receives an input, e.g., a setting to start processing object 100, control circuits 217 or driver circuit 750 may send a voltage and/or a current to LED 240 such that LED 240 may illuminate in a predetermined color for an amount of time, e.g., a duration for the processing of object 100. In some embodiments, LED 240 may be automatically turned on when nebulizer assembly 730 starts to generate mist 104. In some embodiments, LED 240 may be automatically turned off when nebulizer assembly 730 stops generating mist 104.

In some embodiments, the color of LED 240 may change during the processing of object 100 and/or the operation of nebulizer assembly 730. For example, the color of LED 240 may change from a first color to a second color when nebulizer assembly 730 has operated for an amount of time longer than a predetermined threshold. In another example, the color of LED 240 may change before the end of the processing of object 100 and/or the end of the operation of nebulizer assembly 730 to indicate the stage of the process, e.g., an ending of the process. In some embodiments, the color of LED 240 may depend on object 100 and/or liquid 322, e.g., color or material of object 100 and/or mist 104.

In some embodiments, the illumination by LED 240 may be continuous, intermittent, or pulsatile in accordance with the operation mode of nebulizer assembly 730. For example, control circuits 217 may apply a pulsatile voltage or current to LED 240 such that a pulsatile mist 104 generated by nebulizer assembly 730 may be accompanied by a pulsatile illumination by LED 240. The illumination of mist 104 by LED 240 provides an aesthetic and/or interesting display of mist 104 and/or object 100 in chamber 210.

As discussed above, increasing the uniformity of the distribution of the micro droplets of mist 104 in chamber 210 and/or the distribution of the micro droplets of mist 104 surrounding object 100 may increase the evenness and/or uniformity of the smoothing of the surface of object 100, e.g., a substantially uniform degree of smoothness of the surface of object 100 after the processing. It is contemplated that one factor that may decrease the uniformity of the distribution of the micro droplets of mist 104 in chamber 210 is a temperature gradient created by mist 104. During the generation of mist 104, micro droplets of mist 104 may evaporate, which is an endothermic process that absorbs heat from mist 104. Thus, mist 104 cooled by the evaporation may stay around and/or move towards a lower part of chamber 210, leaving warmer air in an upper part of chamber 210, which may result in inadequate or reduced smoothing of the surface of a top part of object 100. In a chamber 210 of a smaller size, this effect of the temperature gradient on the distribution of the micro droplets of mist 104 in chamber 210 may be reduced by the intermittent or pulsatile bursts of mist 104 generated by nebulizer 212, but in a chamber 210 of a larger size, this effect may not be effectively reduced by the intermittent or pulsatile bursts of mist 104.

For the above reasons, in some embodiments, apparatus 200 may include an air-agitating device to increase the uniformity of the distribution of the micro droplets of mist 104 in chamber 210 and/or surrounding object 100. The air-agitating device may create and/or increase the distribution of the micro droplets of mist 104 in chamber 210, e.g., the micro droplets surrounding object 100, by creating and/or increasing the movement and/or turbulence of the air in chamber 210, which may reduce or substantially reduce the temperature gradient chamber 210. In some embodiments, creating and/or increasing the movement and/or turbulence of the air in chamber 210 may further increase the movement of the micro droplets of mist 104. Reducing or eliminating the temperature gradient in chamber 210 and/or increasing the movement of the micro droplets of mist 104 may substantially increase the uniformity of the distribution of the micro droplets of mist 104 in chamber 210, and may, for example, allow a substantial uniform distribution of the micro droplets of mist 104 surrounding object 100. In such instances, the evenness or the uniformity of the smoothing of the surface of object 100 may be increased. For example, the surface of a top part of object 100 and the surface of a bottom part of object 100 may be surrounded or exposed to substantially similar distributions of the micro droplets of mist 104, and thus may have a substantial similar surface roughness or smoothness after the processing of object 100.

Figure 9A:
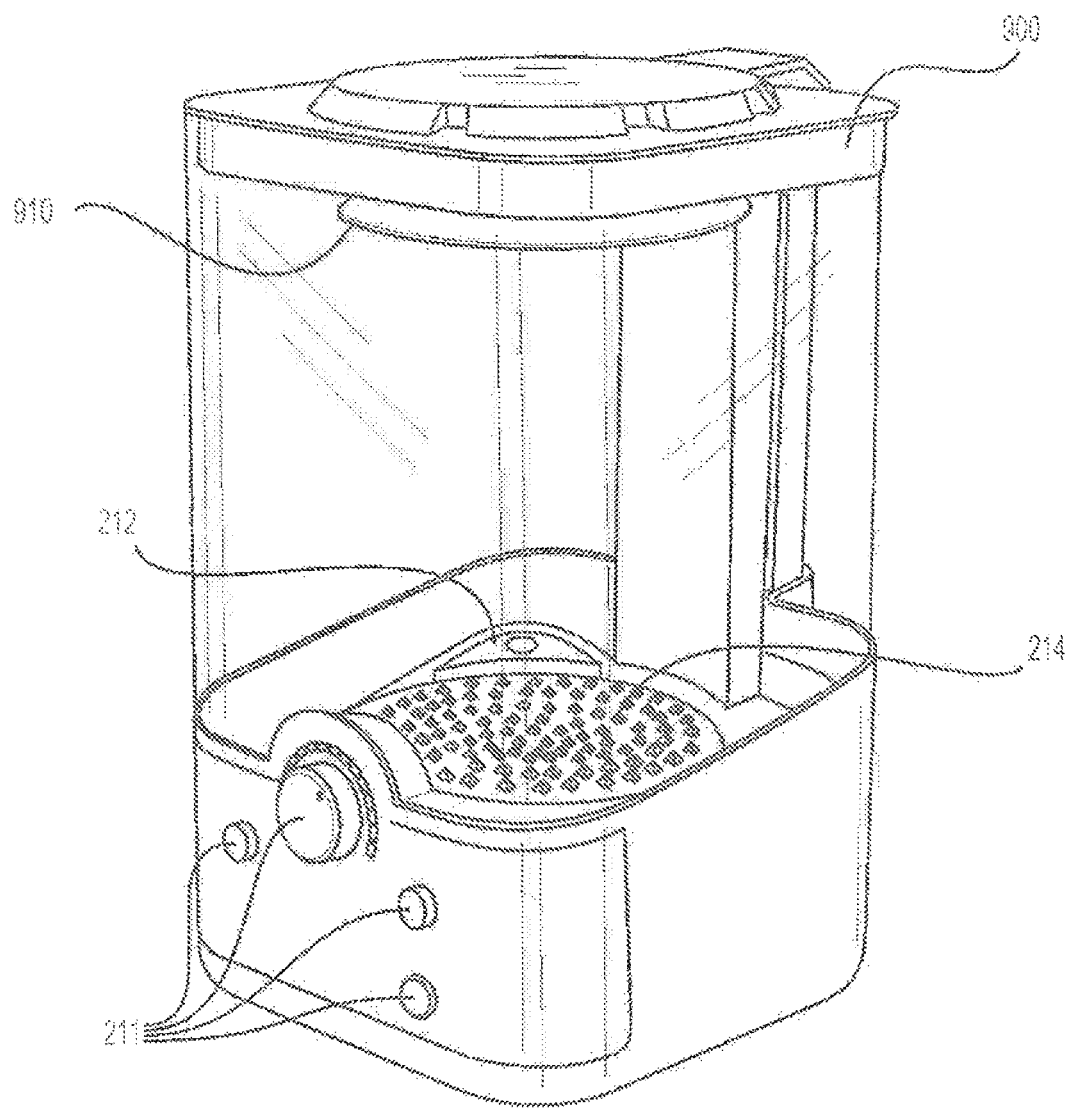
FIG. 9A illustrates a perspective view of an exemplary apparatus, according to embodiments of the present disclosure.
Figure 9B:
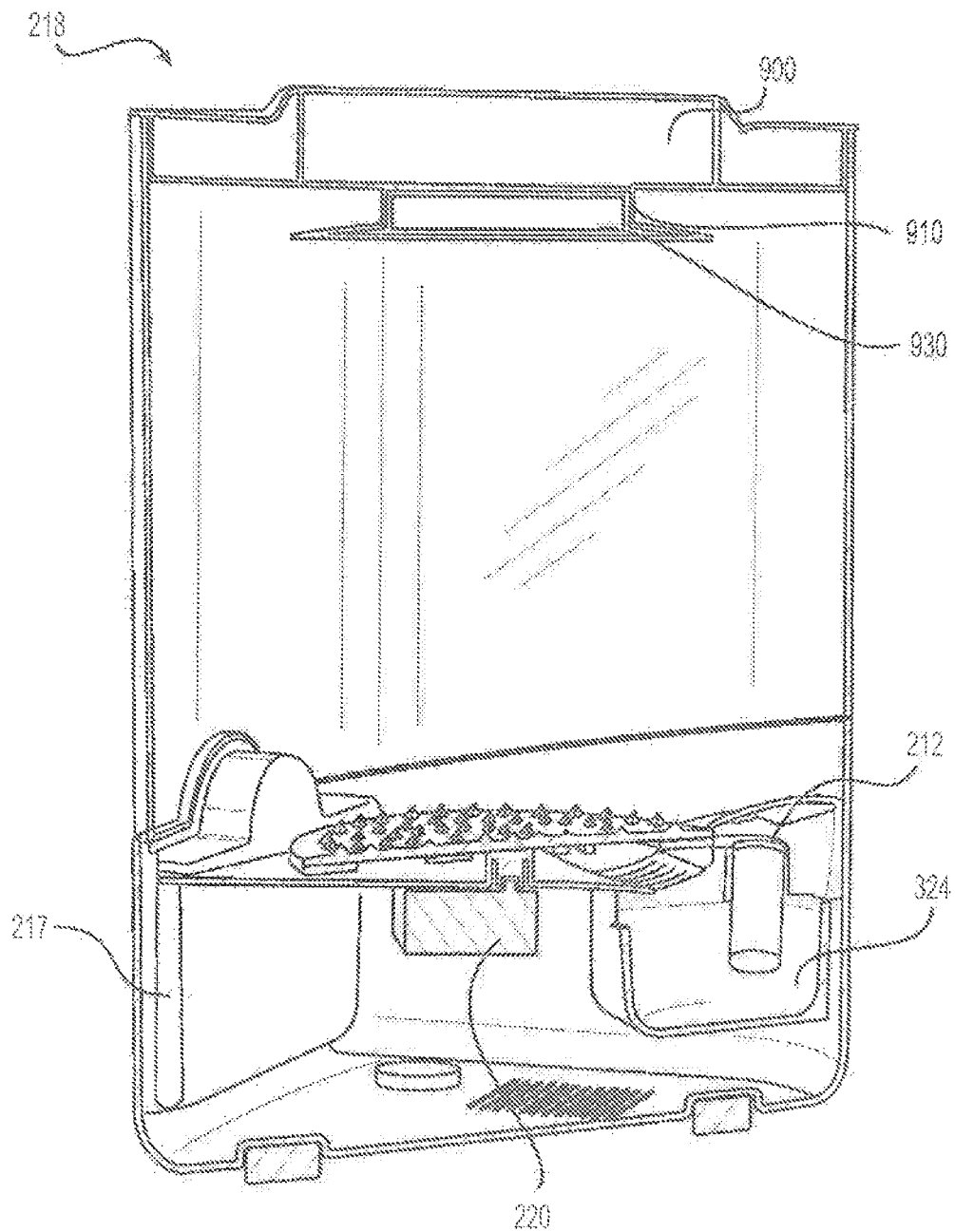
FIG. 9B illustrates a perspective view of a cross-section of an exemplary apparatus, according to embodiments of the present disclosure.
Figure 9C:
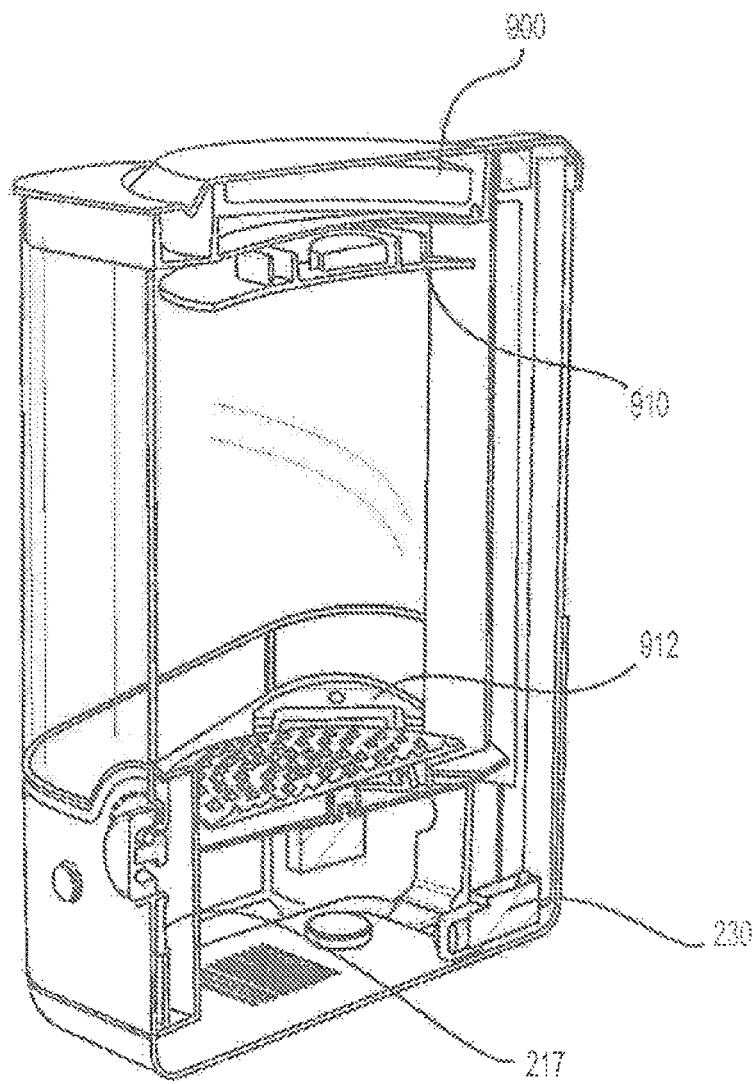
FIG. 9C illustrates a perspective view of a cross-sexton of an exemplary apparatus, according to embodiments of the present disclosure.

In some embodiments, the air-agitating device may be a fan 930. Fan 930 may be installed at a place in chamber 210 that may suitably reduce the temperature gradient in chamber 210 and/or increase the movement of the micro droplets of mist 104. In some embodiments, fan 930 may be installed, for example, in lid 218. As shown in FIGS. 9A-9C, lid 218 may include an upper housing 900 and a lower housing 910. Upper housing 900 and lower housing 910 may be releasably fitted together via, e.g., friction fit press fit, twist fit, snap fit, over-molding or molding, thermal bonding, and/or welding. Additionally or alternatively, upper housing 900 and lower housing 910 may be fixedly fitted together, for example, via an adhesive or a screw mechanism. Fan 930 may be placed or installed inside lower housing 910.

Figure 10A:
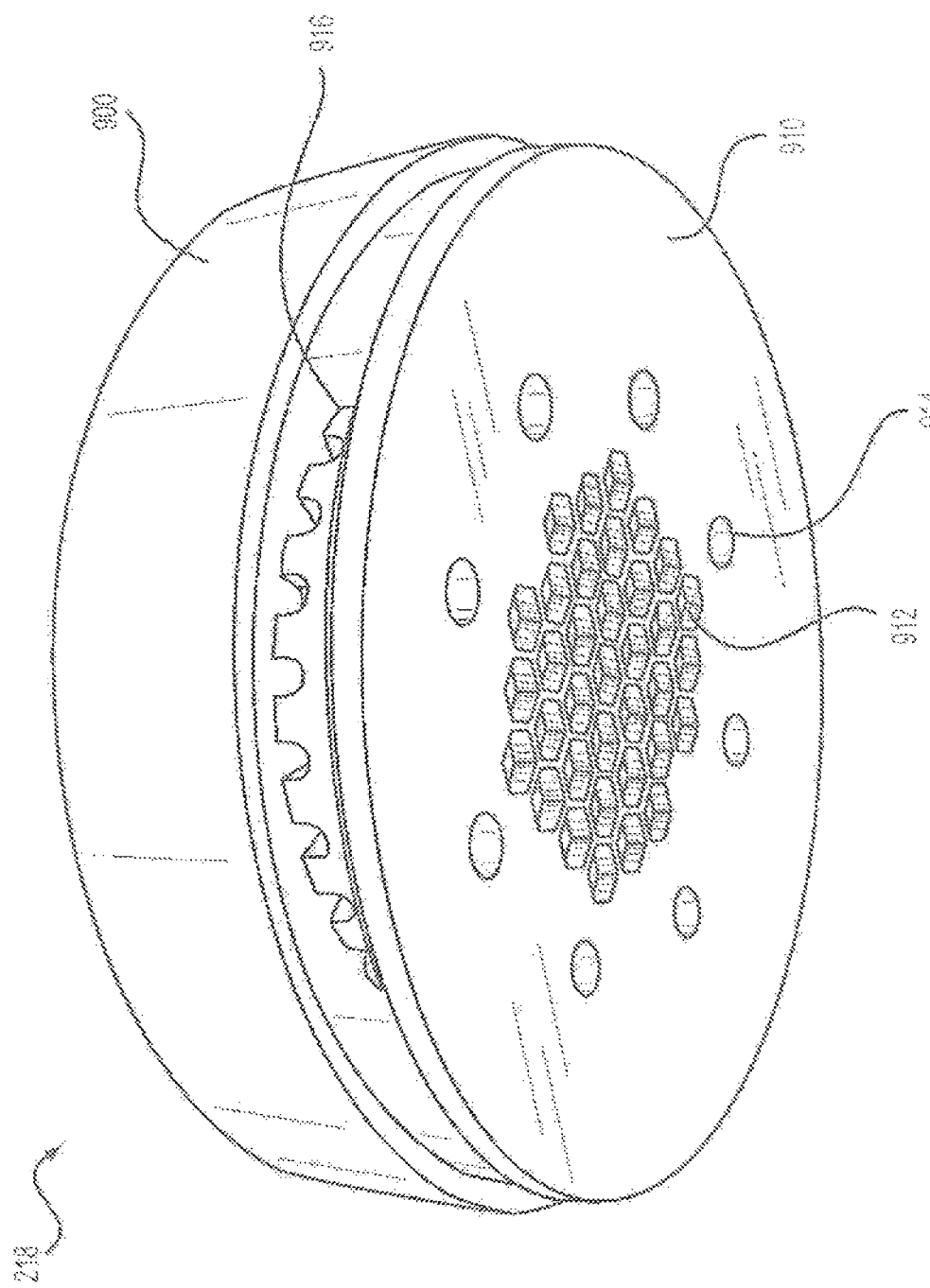
FIG. 10A illustrates a perspective view of a lid of an exemplary apparatus according to embodiments of the present disclosure.
Figure 10B:
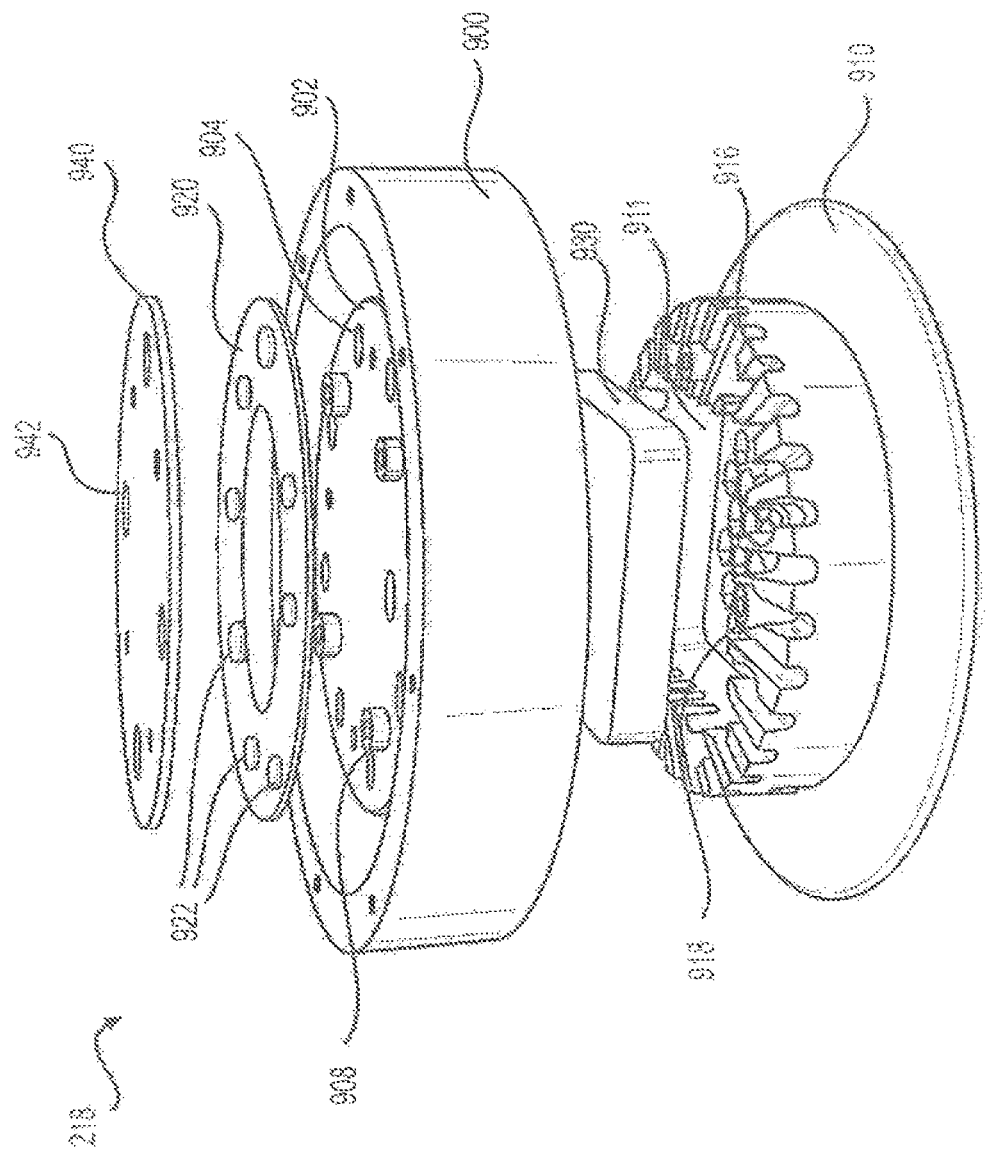
FIG. 10B illustrates an exploded view of a lid of an exemplary apparatus, according to embodiments of the present disclosure.

FIGS. 10A-10C illustrate exemplary embodiments of lid 218 having fan 930 installed inside lower housing 910. As shown in FIGS. 10A-10C, lower housing 910 may have a chamber 911. Chamber 911 may have a shape and/or perimeter substantially similar to that of an outside frame of fan 930 such that fan 930 may be held in chamber 911. Lower housing 910 may include a plurality of air holes 912 that allow airflows having increased velocities caused by fan 930 to enter chamber 210 to cause and/or increase a turbulence of the air in chamber 210. A wall having a plurality of ridges 913 at the top may surround chamber 911. As shown in FIG. 10B, in some embodiments, lower housing 910 may also include one or more projections 918 for fitting with upper housing 900.

Fan 930 may be a mechanical fan, a piezoelectric fan, an electric fan, a mechanical-electric fan, a diaphragm fan, or any suitable type of fan that may generate turbulence of air, such as a brushless DC cooling fan. A brushless DC cooling fan may include a brushless motor that provides the torque, force, and/or moment driving the fan. Brushless motors may not have any mechanical brush contacts with the commutator, i.e., the moving part of a rotary electrical switch, which may reduce the probability of discharging electrons and/or generating electric sparks in mist 104. Thus, in some embodiments, fan 930 is a brushless DC cooling fan, which may increase the safety of using fan 930 in chamber 210 filled with mist 104, e.g., a mist 104 generated from liquid 322 containing a flammable solvent.

During the processing of object 100, fan 930 may operate to create and/or increase the amount of turbulence of the air in chamber 210 to reduce the temperature gradient and increase the distribution of the micro droplets of mist 104. However, it is contemplated that constant stirring and/or substantially increasing the velocity of the movement of the air and the micro droplets of mist 104 in chamber 210 may have one or more effects on the micro droplets. For example, the increased turbulence and/or velocity of the air in chamber 210 may increase the evaporation of the micro droplets in chamber 210. For another example, the increased turbulence and/or velocity of the air in chamber 210 may increase the moving, pushing, and or driving of micro droplets of mist 104 to the walls of chamber 210, where they may then accumulate and flow towards plate 224. Such effects may reduce the amount of micro droplets of mist 104 generated by nebulizer 212, e.g., nebulizer assembly 730, and may affect the smoothing and/or processing of object 100.

It is also contemplated that the effects of fan 930 on the micro droplets of mist 104 may depend on the speed and/or the amount of time fan 930 operates, which may be adjusted or controlled by a driver circuit, control circuits 217, and/or user control 211, for example, to achieve a satisfactory distribution of the micro droplets of mist 104. In some embodiments, the speed of fan 930 may be adjusted and/or reduced by using pulse-width modulating, e.g., modulating the width of a pulsed voltage or current supplied to the fan. Additionally or alternatively, fan 930 may be operated intermittently, e.g., pulsing the operation of fan 930 by switching on and off of its power supply. The period of time for one continuous operation of fan 930 may range from about 1 second to a few seconds, from about a few seconds to about 10 seconds, or from about 10 seconds to less than a minute. The interval between each pulsed operation of fan 930 may range from a few seconds to about tens of seconds, from a few seconds to about 1 minute, or from about 1 minute to a few minutes, or longer. During the interval between the pulsed operations of fan 930, nebulizer 212 may generate mist 104, and the amount of micro droplets of mist 104 may be increased in chamber 210, and the micro droplets may be accumulated. During the period of the operation of fan 930. The amount of turbulence of the air in chamber 210 may be increased and the uniformity of the distribution of the micro droplets of mist 104 may then be increased. In some embodiments the distribution of the micro droplets of mist 104 may be substantially uniform during or at the end of an operation of fan 930. The on-and-off operation of fan 930 may be repeated by as many times as needed for the processing of object 100.

It is further contemplated that fan 930 may be used to substantially reduce the amount of micro droplets of mist 104 in chamber 210 after the processing of object 100. For example, fan 930 may be operated at a full speed for a period of time, ranging from a few seconds to a few minutes, to clear or purge mist 104. Such a clearing or purging operation may allow object 100 and the smoothness of the surface of object 100 to be observed, and/or may create an interesting effect of revealing object 100 after the processing of object 100 is completed. Such clearing or purging operation may reduce the time for mist 104 to substantially disappear before object 100 is retrieved, and may thus reduce the total amount of time for processing object 100. Such clearing or purging operation may also reduce the amount of mist 104 released out of chamber 210 when lid 218 is open, and/or may reduce the flammability of the air inside chamber 210 when mist 104 is flammable, for example, mist 104 generated from liquid 322 containing flammable substance.

In some embodiments, as shown in FIG. 10B, lid 218 may include one or more light sources 922, e.g., LEDs or light bulbs, in upper housing 900 to illuminate object 100 and/or mist 104. Upper housing 900 may have a raised surface 902 and a light pipe or cover 920 may be placed on top of raised surface 902. Light pipe or cover 920 may be transparent. In some embodiments, raised surface 902 may have one or more projections 908, each of which may fit into a hole in light pipe 920, to secure or fasten light pipe 920 to raised surface 902. In some embodiments, light pipe 920 and raised surface 902 may be releasably fitted together via, e.g., friction fit, press fit, twist fit, snap fit, overmolding or molding, thermal bonding, and/or welding. Additionally or alternatively, light pipe 920 and raised surface 902 may be fixedly fitted together, for example, via an adhesive or a screw mechanism.

In some embodiments, light pipe 920 may have one or more lenses. Each lens may be placed below a light source 922 to collimate the light emitted from light source 922. The collimated light from light source 922 may pass through an aperture 904 in raised surface 902 and an aperture 914 in lower housing 910. The number of apertures 904 and apertures 914 may be the same as that of light sources 922. Light sources 922 may emit light of the same color or of different colors. Light sources 922 may be turned on or turned off at different stages during the processing of object 100. For example, light sources 922 may be turned on at the start and/or the end of processing object 100, or during the processing of object 100. The illumination of object 100 and/or mist 104 by light sources 922 may add interesting and aesthetic effects of the processing as well as functional indication of the operation of apparatus 200. The functional indication may include, for example, providing visual signals to a user indicating the start or the completion of the processing of object 100 and/or alerting any problems during the processing of object 100, e.g., inadequate amount of liquid 322 in chamber 216 or reservoir 324, or increased temperature in chamber 210.

As shown in FIGS. 10B and 10C, in some embodiments, lid 218 may include a circuit board 940, e.g., a printed circuit board (PCB). Light sources 922 and/or fan 930 may be electrically connected to circuit board 940. Circuit board 940 may be, for example, placed on top of light pipe 920 in lid 218. In some embodiments, the operation of light sources 922 and/or the operation of fan 930 may be adjusted or controlled by circuit board 940. Circuit board 940 may be electrically connected to control circuits 217 and/or user control 211, for example, and may receive electrical signals from control circuits 217 and/or user control 211. In some embodiments, control circuits 217 and/or user control 211 may control the operation of light sources 922 and fan 930 to coordinate with the operation of nebulizer 212. In one example, fan 930 may be controlled by circuit board 940 and/or control circuits 217 to start to operate upon or after the start of nebulizer 212. In another example, light sources 922 may be controlled by circuit board 940 and/or control circuits 217 to illuminate at the start of nebulizer 212 or when nebulizer 212 stops operation. In other embodiments, the operation of light sources 922 and/or fan 930 may be adjusted or controlled by adjusting user control 211. For example, when user control 211 receives an input, e.g., a setting to start nebulizer 212, circuit board 940 may turn on fan 930 and/or light sources 922.

After object 100 has been processed or surrounded by the micro droplets of mist 104, there may be some micro droplets condensed to some residual liquid 322 on the surface of object 100. In some embodiments, this residual liquid 322 may be removed by evaporation, or by drying using radiant heat, forced air, a vacuum, or any other suitable method. In some embodiments, fan 930 may be used to remove the residue liquid 322 on object 100, e.g., by increasing the evaporation of the residue liquid 322.

In some embodiments, the processing, e.g., polishing or smoothing, of object 100 by apparatus 200 may include the following steps 1 to 4. Step 1 may include receiving object 100 into chamber 210. For example, fixture plate 214 may be moved upwards up to top cover 219 by lifting arm 228 and lifting plate 226. Object 100 may be received onto fixture plate 214 and then be lowered and placed inside chamber 210 as fixture plate 214 moves downwards with lifting arm 228 and lifting plate 226. Step 1 may include opening lid 218 before object 100 is received in chamber 210 and closing lid 218 afterwards. Step 1 may also include placing liquid 322 in chamber 216 or reservoir 324.

Step 2 may include surrounding object 100 with mist 104 for a predetermined period of time. Step 2 may include applying a sufficient amount of voltage and/or current to nebulizer 212 to generate micro droplets of mist 104 from liquid 322. Step 2 may also include operating nebulizer 212 in a continuous and/or an intermittent mode to increase the uniformity of the distribution of the micro droplets of mist 104 in chamber 210 and/or surrounding object 100. Additionally or alternatively, step 2 may Include increasing the uniformity of the distribution of micro droplets by increasing the turbulence of the air in chamber 210 using an air-agitating device, for example, fan 930.

The predetermined period of time for step 2 or the operation of nebulizer 212 may vary depending on various factors, including, for example, the size of object 100, the size of chamber 210, the number of nebulizers 212 used, the amount and/or density of mist 104 generated by nebulizer 212, the environmental temperature in chamber 210, the type of material of object 100, the level of roughness or size of the ridges along the surface of object 100, and the type and/or composition of liquid 322 used to generate the micro droplets of mist 104. The total period of time for the operation of nebulizer 212 or for surrounding object 100 with the micro droplets of mist 104 ranges, for example, from about a few minutes to about 10 minutes, from about 10 minutes to about 20 minutes, from about 20 to about 30 minutes, from about 30 to about 40 minutes, from about 40 to about 50 minutes, from about 50 to about 60 minutes, from about 10 to about 30 minutes, from about 10 to about 40 minutes, from about 10 to about 50 minutes, from about 20 to about 40 minutes, from about 20 to about 50 minutes, from about 20 to about 60 minutes, from about 30 to about 50 minutes, from about 30 to about 60 minutes, from about 40 to about 60 minutes, or from about 10 to about 60 minutes. In other embodiments, any suitable period of time during which a satisfactory surface roughness and/or smoothness of object 100 is achieved may be selected for the operation of nebulizer 212 or apparatus 200.

Step 3 may include terminating nebulizer 212 from generating mist 104. Step 3 may also include clearing or purging mist 104 in chamber 210 to reveal object 100 in chamber 210. For example, step 3 may include operating fan 930 at a full speed for a period of time to substantially reduce the amount of micro droplets of mist 104 in chamber 210, which may reduce a waiting time for object 100 to be retrieved. Step 3 may further include switching off fan 930 after the period of time for clearing or until mist 104 is substantially cleared. Step 3 may further include removing residue liquid 322 on the surface of object 100 by increasing the evaporation of residue liquid 322 on object 100.

Step 4 may include presenting object 100 outside of chamber 210 for inspection and/or retrieval. For example, when the processing of object 100 is completed or a smoothness of the surface of object 100 is satisfactory, fixture plate 214, lid 218, and lifting arm 228 may move upwards, opening lid 218, raising object 100 and fixture plate 214, and then presenting object 100 out of chamber 210. Step 4 may also include lowering fixture plate 214 and closing lid 218 after object 100 is removed from fixture plate. In some embodiments, steps 1 to 4 of the processing of object 100 may be iterated as few as or as many times as needed until a satisfactory roughness or smoothness of the surface of object 100 are achieved.

It is to be understood that the particular examples and embodiments set forth herein are non-limiting, and modifications to structures, dimensions, materials, and methodologies may be made without departing from the scope of the present teachings. It will be evident that various modifications and changes may be made without departing from the broader spirit and scope of the disclosure as set forth in the claims that follow. The specification and drawings are accordingly to be regarded as illustrative rather than restrictive.

What is claimed is:

1. A method for smoothing a surface of an additive manufactured object, the method comprising:

receiving the object in a chamber;

generating a mist into the chamber by a nebulizer assembly from a liquid held in a reservoir, the mist comprising micro-droplets of the liquid; and surrounding the object with the mist, the mist interacting with the surface of the object so as to improve smoothness of the object surface;

wherein the nebulizer assembly comprises a mesh, a wick having a distal end submerged in the liquid, and a vibrating element causing the mesh to generate the mist from the liquid approximately at room temperature and without substantially vaporizing the liquid; and wherein the liquid comprises at least one solvent selected from alcohols, ethers, esters, and ketones.

2. The method of claim 1, further comprising making the object by an additive manufacturing technique using at least one thermoplastic polymer.

3. The method of claim 2, wherein the at least one thermoplastic polymer is selected from vinyl acetal polymers, acrylonitrile-butadiene-styrene, poly (lactic acid), polycarbonate, polystyrene, polycaprolactone, polyamide and polyamide copolymers, and cellulose based polymers.

4. The method of claim 1, wherein the nebulizer assembly further comprises a driver circuit electrically connected to the vibrating element.

5. The method of claim 4, further comprising operating the nebulizer assembly by control circuits comprising a memory and a processing circuit electrically connected to the driver circuit, wherein the memory stores a plurality of instructions for the operation of the nebulizer assembly, and wherein the processing circuit executes at least one of the instructions and sends electrical signals associated with the executed instructions to the driver circuit.

6. The method of claim 5, wherein the control circuits are electrically connected to a user control.

7. The method of claim 1, wherein the mesh and the vibrating element form an integrated part.

8. The method of claim 1, wherein a plate is located between the chamber and the reservoir, and wherein the plate has at least one opening and/or a concave surface configured to allow micro droplets of the mist to pass through.

9. The method of claim 1, wherein the object is received on a rotatable platform in the chamber, the method further comprising rotating the rotatable platform by a motor.

10. The method of claim 1, wherein the nebulizer assembly further comprises a coupler placed between the vibrating element and the wick, the coupler transporting the liquid from the wick to the mesh with limited or minimized impact on movement of the mesh caused by the vibrating element.

11. The method of claim 10, wherein the coupler and the wick are one integrated part.

12. The method of claim 10, wherein the coupler and/or the wick are made of a material that does not substantially dissolve in or react with the liquid.

13. The method of claim 12, wherein the material of the coupler and/or the wick comprises a plurality of pores and/or channels.

14. The method of claim 13, wherein the material of the coupler and/or the wick is a soft, a compressible, a compliant, a squishy, a foam-like, a sponge, or a resiliently deformable material.

15. The method of claim 1, wherein the mist comprises micro droplets whose diameters range from 5 μm to 100 μm.

16. The method of claim 1, further comprising illuminating the mist and/or the object using a plurality of light sources.

17. The method of claim 1, further comprising raising the object out of the chamber, and/or lowering the object into the chamber using an automatic or a manual lifting mechanism.

18. The method of claim 1, further comprising increasing movement of air and/or micro droplets of the mist in the chamber using an air-agitating device.

19. The method of claim 1, further comprising generating by the nebulizer assembly a continuous, intermittent, or pulsatile mist, or combinations thereof.

20. The method of claim 1, wherein the liquid comprises water.

* * * * *